(12) United States Patent
Kudo

(10) Patent No.: US 7,584,381 B2
(45) Date of Patent: Sep. 1, 2009

(54) SEMICONDUCTOR INTEGRATED CIRCUIT DEVICE, DEBUG SYSTEM, MICROCOMPUTER, AND ELECTRONIC APPARATUS

(75) Inventor: Makoto Kudo, Fujimi (JP)

(73) Assignee: Seiko Epson Corporation (JP)

( * ) Notice: Subject to any disclaimer, the term of this patent is extended or adjusted under 35 U.S.C. 154(b) by 495 days.

(21) Appl. No.: 11/358,843

(22) Filed: Feb. 20, 2006

(65) Prior Publication Data

US 2006/0218445 A1 Sep. 28, 2006

(30) Foreign Application Priority Data

Mar. 25, 2005 (JP) ............................. 2005-089164

(51) Int. Cl.
*G06F 11/00* (2006.01)
(52) U.S. Cl. .................... 714/30; 714/27; 714/34; 714/39
(58) Field of Classification Search .................. 714/25, 714/27, 28, 30, 34, 39
See application file for complete search history.

(56) References Cited

U.S. PATENT DOCUMENTS

| | | | | |
|---|---|---|---|---|
| 5,630,102 A | * | 5/1997 | Johnson et al. | 714/E11.216 |
| 5,978,937 A | * | 11/1999 | Miyamori et al. | 714/45 |
| 6,523,136 B1 | | 2/2003 | Higashida | |
| 6,553,506 B1 | | 4/2003 | Hijikata et al. | |
| 6,647,511 B1 | * | 11/2003 | Swoboda et al. | 714/30 |
| 6,708,289 B1 | * | 3/2004 | Kudo | 714/28 |
| 7,236,921 B1 | * | 6/2007 | Nemecek et al. | 714/28 |
| 2002/0026553 A1 | | 2/2002 | Saito | |
| 2002/0091494 A1 | * | 7/2002 | Kudo | 702/119 |
| 2002/0152427 A1 | * | 10/2002 | Ok | 714/34 |

FOREIGN PATENT DOCUMENTS

| | | |
|---|---|---|
| JP | 51-112239 | 10/1976 |
| JP | 55-162155 | 12/1980 |
| JP | 62-183251 | 11/1987 |
| JP | 08-255096 | 10/1996 |
| JP | 11-282719 | 10/1999 |
| JP | 2002-271416 | 9/2002 |
| JP | 2003-271416 | 9/2003 |

\* cited by examiner

*Primary Examiner*—Robert Beausoliel
*Assistant Examiner*—Joseph D Manoskey
(74) *Attorney, Agent, or Firm*—Harness, Dickey & Pierce, P.L.C.

(57) ABSTRACT

An integrated circuit device including an internal debug module for on-chip debugging while communicating with a pin-saving debug tool and a CPU, the integrated circuit device comprises; a first debug terminal coupled to a first communication line; a first common control unit that controls using the first communication line for both transmission of a serial data signal corresponding debug data for sending, which is sent and/or received to and/or from the pin-saving debug tool during on-chip debugging and transmission of a run/break state signal, which shows a run state or a break state of the CPU.

20 Claims, 16 Drawing Sheets

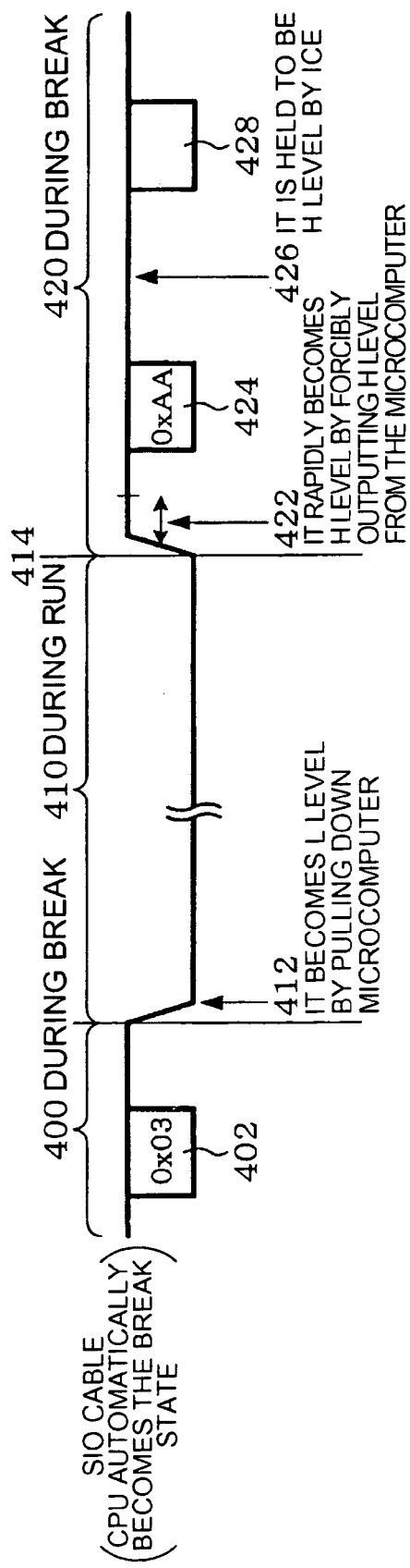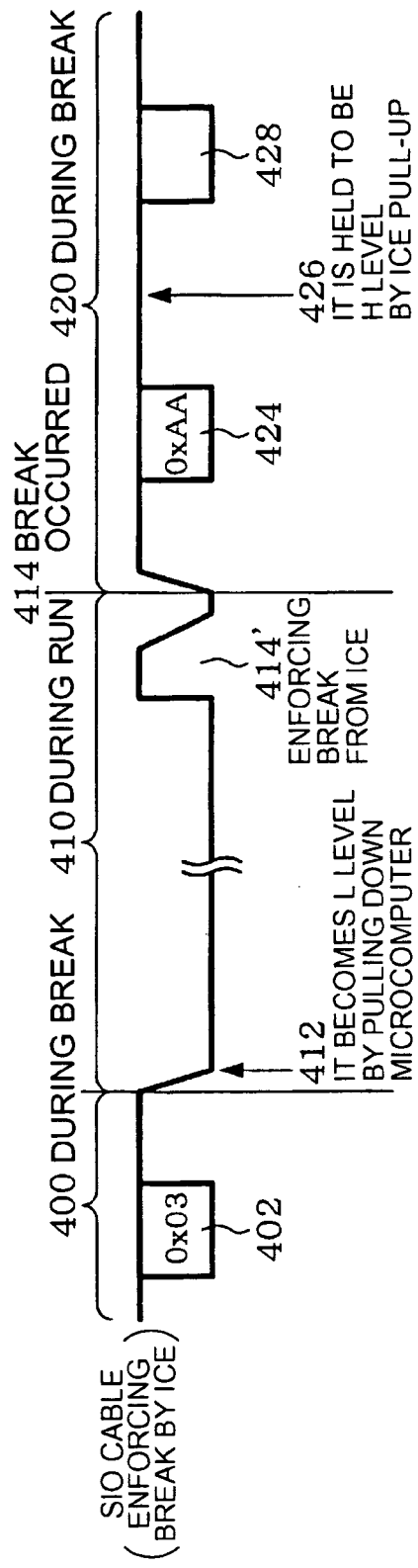

US 7,584,381 B2

SEMICONDUCTOR INTEGRATED CIRCUIT DEVICE, DEBUG SYSTEM, MICROCOMPUTER, AND ELECTRONIC APPARATUS

BACKGROUND

1. Technical Field

The present invention relates to debug systems, semiconductor integrated circuit devices, microcomputers, and electronic apparatus.

2. Related Arts

In recent years, there is increasing the demand for microcomputers which are built in electronic apparatus, such as game devices, automobile-navigation systems, printers, and personal digital assistants, and capable of realizing advanced information processing. Such a built-in type microcomputer is generally mounted in a user board called as a target system. Then, in order to support development of the software that operates this target system, a pin-saving debug tool (a software development tool for supporting), such as in-circuit emulator (ICE) is widely used.

Here, as such ICE, conventionally, ICE called a CPU replacement as shown in FIG. 16 has been mainstream. In this ICE for CPU replacement, a microcomputer 302 is removed from a target system 300 at the time of debugging, and coupled to a probe 306 of a debug tool 304 instead. Then, this debug tool 304 emulates the operation of the removed microcomputer 302. Moreover, this debug tool 304 carries out various processing required for debugging.

However, this ICE for CPU replacement has a drawback that the count of lines 308 of the probe 306 increases as the pin count of the probe 306 increases. For this reason, it is difficult to emulate high-frequency operation of the microcomputer 302 (e.g., limited to around 33 MHz). Moreover, the design of the target system 300 also becomes difficult. Furthermore, the operation environment (timings and load conditions of the signal) of the target system 300 varies between at the time of actual operation in which the microcomputer 302 is mounted and operated, and at the time of a debug mode in which the operation of the microcomputer 302 is emulated with the debug tool 304. Moreover, the ICE for CPU replacement also has a problem that differently designed debug tools and probes with different pin counts and different pin positions need to be used for different microcomputers, even if they are the derivative products.

On the other hand, in order to resolve such drawbacks of the ICE for CPU replacement, there is known other ICE in which the debug pins and functions for realizing the same function as that of the ICE are mounted on a mass-production chip. For example, as such ICE for mounting a debug function, there is known microcomputers that incorporate an inner debug module, the inner debug module carrying out clock synchronous communication with the pin-saving debug tool (ICE or the like) and having an on-chip debug function to carry out debug commands inputted from the debug tool.

In such a case, the microcomputer carries out debugging through clock synchronous communication with the debug tool.

In this case, between a debug tool and a microcomputer, there are required: a break input from the debug tool to the microcomputer; a break/run state output from the microcomputer to the debug tool; data (debug commands, or the like) communication to the microcomputer from the debug tool; data communication from the microcomputer to the debug tool; a communication synchronous clock between the input debug tool and the microcomputer; a plurality of communication pins for additional information, such as a trace to the debug tool from the microcomputer; and terminals (pins), such as a ground line between the input debug tool and the microcomputer.

JP-A-8-255096 is a first example of related art. JP-A-11-282719 is a second example of related art.

Although the debug terminals (pins) rapidly increase as summing up such terminals (pins), it is preferable that terminals required only at the time of debugging and unneeded for end users be as less as possible. Moreover, the increase of the terminal (pin) count of the microcomputer PKG will lead to the cost increase or the like of ICs.

Furthermore, when the pin count between the board and debug tool will increase, designing of the board increasingly difficult, thereby reducing the reliability and causing the increase of the development cost of the board and system and the increase of the development time.

SUMMARY

An advantage of the invention is to provide a debug system, a target system, an integrated circuit device, or the like, which further save the terminals unnecessary for end users in the target system of a type in which the debug pins and functions are mounted on a mass-production chip.

According to an first aspect of the invention, an integrated circuit device including an internal debug module for on-chip debugging while communicating with a pin-saving debug tool and a CPU, the integrated circuit device comprises: a first debug terminal coupled to a first communication line; a first common control unit that controls using the first communication line for both transmission of serial data signal corresponding to debug data for sending, which is sent and/or received to an/or from the pin-saving debug tool during on-chip debugging and transmission of a run/break state signal, which shows a run state or a break state of the CPU.

The communication through the first communication line may be synchronous or asynchronous. Further, the first communication line may be able to serially transmit debug data from the integrated circuit to the debug tool. This may be a transmitting line in all double communication or a transmitting and receiving line in a half-double communication.

The state of run in the CPU is defined as executing an ordinal program by The CPU (a user mode) for example, the state of break in the CPU is defined as executing an debug program by the CPU (a debug mode) for example.

As an example of the first common control unit, a circuit may generate an output signal by merging run/break signal with serial data signal corresponding to transmission data to be debugged and the output signal may be output to the first communication line via the first debug terminal.

According to the first aspect of the invention, the first communication line is commonly used as both transmitting the run/break-state signal of the CPU and transmitting data to be debugged. Thus, there is no necessity of installing a specific terminal for debug and outputting the run/break-state signal.

Therefore, the numbers of terminals (pins) which are used only in a debug mode, not used in a user mode (a user program) can be reduced, preventing manufacturing cost of an integrated circuit from increasing.

According to a second aspect of the invention, in the integrated circuit device, the first debug terminal is coupled to a single communication line as the first communication line which transmits and receives debug data with a half-double bilateral communication. The first common control unit that controls using the first communication line for both transmission and receipt of serial data signal corresponding to debug data for transmitting and receiving, which is sent and/or received to and/or from the pin-saving debug tool during on-chip debugging and transmission of run/break state signal, which shows a run state or a break state of the CPU.

According to this aspect of the invention, transmission and receipt of serial data signal corresponding to debug data is performed with a half-double bilateral communication at the time of debugging. Therefore, a single communication can transmit and receive debug data and transmit run/break state signal, reducing the numbers of terminals for debugging.

According to a third aspect of the invention, in the integrated circuit device, an enforcing break input is received from the debug tool via the first communication line. The first common control unit includes a circuit that detects the enforcing break input signal within received data input via the first communication line, and changes the CPU to be in the break state when detecting the enforcing break input.

According to this aspect of the invention, the enforcing break input is received from the debug tool via the first communication line. Thus, there is no necessity of is no necessity of installing a specific terminal for inputting the enforcing break signal.

According to a fourth aspect of the invention, in the integrated circuit device, the first common control unit includes a circuit that controls the first communication line to maintain the first level when the CPU is in the run state, and the second level when the CPU is in the break state.

Further, the circuit controls the first communication line to transmit pulses corresponding to serial data to be debugged at the time of transmitting serial data to be debugged.

The fist level may be L level or H level. The second level may be inverted against the first level. If the fist level is L level, the second level is H level, and vice versa.

According to this aspect of the invention, at the time of transmitting serial data to be debugged, a pulse corresponding to serial data is transmitted from the first transmitting line. Further, if it is more than the above time (when not transmitting and receiving debug data at the time of the run or debugging state), the first communication line is hold to be the first level when the CPU is in the run state, and the first communication line is hold to be the second level when the CPU is in the break state.

Therefore, the debug tool determines that the CPU in the integrated circuit is in the run state when the first communication line is hold to be the first level, and that the CPU in the integrated circuit is in the break state when the first communication line is hold to be the second level. Further, it determines that pulses are serial data to be debugged when it receives pulses from the first communication line.

According to a fifth aspect of the invention, in the integrated circuit device, the first common control unit includes a portion that controls the first communication line to transmit a predetermined break pulse when the CPU is transferred to be in the break state.

It may include a circuit that generates a predetermined break pulse when the CPU is transferred to be in the break state (a debug mode) from the run state (a user mode), for example. Otherwise, it may generate a signal with a software when the CPU is transferred to be in the break state (a debug mode) from the run state (a user mode).

According to a sixth aspect of the invention, in the integrated circuit device, the first common control unit includes a circuit which pull-up or down the first communication line to be the first level and a circuit which generates an enable signal for switching on or off the circuit pulling-up or down corresponding to the state when the CPU is in the run or the break.

For example, if a device is designed so that the run/break-state signal takes L level in the run state and H level in the break state, it may include a circuit that pulls-down the first communication line to L level and a circuit that generates an enable signal for switching the pull down circuit on when the CPU is in the run state, and switching it off when the CPU is in the break state.

Further, the present invention can be applied to a structural design where the run/break-state signal is H level during the run state, and the run/break-state signal is L level during the break state. Further, a pull up circuit may be applied instead of a pull down circuit and switching on and off under the run state and/or the break state may be inverted against the above case.

According to a seventh aspect of the invention, in the integrated circuit device, the first common control unit includes an enforcing output circuit that outputs a value corresponding to the second level so as to make the first communication line have the second level when the pulling-up or down circuit is in the off state.

For example, if a device is designed so that the run/break-state signal takes L level in the run state and H level in the break state, it may include the enforcing output circuit that outputs a value corresponding to H level so as to make the first communication line have H level when the circuit for pulling-down the first communication line is in the off state.

Further, the present invention can be applied to a structural design where the run/break-state signal is H level when it is in the run state, and the run/break-state signal is L level when it is in the break state. Further, a pull up circuit may be applied instead of a pull down circuit and switching on and off under the run state and/or the break state may be inverted against the above case.

According to a eighth aspect of the invention, in the integrated circuit device, an integrated circuit device including an internal debug module for on-chip debugging while synchronously communicating with a pin-saving debug tool and a CPU, the integrated circuit device comprises; a second debug terminal coupled to a second communication line; a second common control unit that controls using the second transmission line for both transmission of a clock signal for synchronization, which is necessary for on-chip debugging with the pin-saving debug tool, and transmission of a run break state signal, which shows a run state or a break state of the CPU.

The state of run in the CPU is defined as executing an ordinal program by The CPU (a user mode) for example, the state of break in the CPU is defined as executing an debug program by the CPU (a debug mode.)

As an example of the second common control unit, a circuit may generate an output signal by merging the run/break signal with the synchronization clock signal for debugging and the output signal may be output to the second communication line via the second debug terminal.

According to this aspect of the invention, the second communication line is used as both transmitting the run/break-state signal of the CPU and the synchronization clock signal for debugging. Thus, there is no necessity of installing a specific terminal for debugging and outputting the run/break-state signal.

Therefore, the numbers of terminals (pins) that are used only in a debug mode, and not used in a user mode (a user program), can be reduced, preventing manufacturing cost of an integrated circuit from increasing.

According to a ninth aspect of the invention, in the integrated circuit device, the second common control unit includes a circuit that outputs a clock signal for synchronization to the second communication line when the CPU is in the break state, and masks the output of a clock signal for synchronization to the second communication line when the CPU is in the run state.

According to this aspect of the invention, the clock signal for synchronization is output to the second communication line when the CPU is in the break state, and the clock signal for synchronization is not output to the second communication line when the CPU is in the run state. But this structure doesn't yield any problems since there is no necessity of a clock signal for synchronization on the debug tool under the run state.

The debug tool may judge that the CPU is in the break mode (the debug mode) when the clock signal for synchronization is received from the second communication line, and the CPU is in the run mode (the user mode) when the clock signal for synchronization is not received.

According to tenth aspect of the invention, in a debug system including a pin-saving debug tool and a target system, which is an object to be debugged by the debug tool, the target system comprises an integrated circuit device including an internal debugging module for on-chip debugging while communicating with the pin-saving debug tool, and a CPU, the integrated circuit device includes: a first debug terminal coupled to a first communication line; a first main common control unit that controls using the first main communication line for both transmission of serial data signal corresponding to debug data for transmission, which is sent and/or received to and/or from the pin-saving debug tool during on-chip debugging, and transmission of a run/break state signal, which shows a run state or a break state of the CPU. The debug tool includes: a first sub debug terminal coupled to the first communication line; a first sub common control unit that controls using the first communication line for both transmission of serial data signal corresponding to debug data for transmission, which is sent and/or received to and/or from the integrated circuit device during on-chip debugging, and receipt of a run/break state signal, which shows a run state or a break state of the CPU.

According to a eleventh aspect of the invention, in the integrated circuit device, the first debug terminal is coupled to a single communication line as the first communication line, which transmits and receives debug data with a half-double bilateral communication. The first common control unit in the integrated circuit that controls using the first communication line for both transmission and receipt of serial data signal corresponding to debug data for transmitting and receiving, which is sent and/or received to and/or from the pin-saving debug tool during on-chip debugging and transmission of run/break state signal, which shows a run state or a break state of the CPU. The first sub common control unit in the debug tool that controls using the first communication line for both transmission and receipt of serial data signal corresponding to debug data for bilaterally transmitting and receiving, which is sent and/or received to and/or from the integrated circuit device during on-chip debugging the integrated circuit device and transmission of run/break state signal, which shows a run state or a break state of the CPU.

According to twelfth aspect of the invention, in a debug system, the integrated circuit is formed so as to receive an enforcing break signal from the debug tool via the first communication line. The first main common control unit includes a circuit that detects the enforcing break signal within received data input via the first communication line, and changes the CPU to be the break state when detecting the enforcing break signal. The first sub common control unit in the debug tool includes an enforcing-break-output control unit that outputs an enforcing-break-input signal to the first communication line via the first sub debug terminal, wherein the enforcing-break-input signal makes the integrated circuit device be in the break state.

According to thirteenth aspect of the invention, in a debug system, the first main common control unit in the integrated circuit device includes a circuit that controls the first communication line to maintain the first level when the CPU is the run state and the second level when the CPU is in the break state. Further, the circuit controls the first communication line to transmit pulses corresponding to serial data to be debugged at the time of transmitting serial data to be debugged. The debug tool determines that the CPU in the integrated circuit is in the run state when the first communication line is hold to be the first level, and that the CPU is in the break state when the first communication line is hold to be the second level. Further, it determines that pulses are serial data to be debugged when it receives pulses from the first communication line. The debug tool determines that the CPU in the integrated circuit is in the run state when the first communication line is hold to be the first level, and that the CPU is in the break state when the first communication line is hold to be the second level. Further, it determines that pulses are serial data to be debugged when it receives pulses from the first communication line.

According to fourteenth aspect of the invention, in a debug system, the first common control unit includes a portion that controls the first communication line to transmit a predetermined break pulse when the CPU is changed to be in the break state. The debug tool includes a unit for detecting the predetermined break pulse within the received signals in the first communication line and a unit for judging that the integrated circuit is changed to be the break state when it detects the predetermined break pulse.

It may include a circuit, for example, which generates a predetermined break pulse when the CPU is changed to be in the break state (a debug mode) from the run state (a user mode). Otherwise, it may generate a signal with a software when the CPU is changed to be in the break state (the debug mode) from the run state (the user mode.)

The unit for detecting the predetermined break pulse within the received signals in the first communication line may constitutes an exclusive circuit for processing it as a hardware. Other wise it may judge the detection with software installed in the CPU.

Further, the unit for judging that the integrated circuit is changed to be the break state when it detects the predetermined break pulse may be a judging portion which is a part of software installed in the CPU, for example.

According to fifteenth aspect of the invention, in a debug system, the first common control unit in the integrated circuit includes: a circuit that pulls-up or down the first transmission line to be a first level; and a circuit that generates an enable signal for switching the pulling-up or down circuit on and/or off in response to the run state or the break state of a CPU. A board of the debug tool or the target system includes a circuit that that pulls-up or down the first transmission line to be a second level.

For example, if a device is designed so that the run/break-state signal takes L level in the run state and H level in the break state, it may include a circuit that pulls-down the first communication line to L level and a circuit that generates an enable signal for switching the pull down circuit on when the CPU is in the run state, and switching it off when the CPU is in the break state.

Further, the present invention can be applied to a design where the run/break-state signal is H level when it in the run state, and the run/break-state signal is L level when it in the break state. Further, the pull-down circuit may be replaced with a pull-up circuit and switching ON/OFF in the run/break state of the above description may be inverted.

The circuit that that pulls-up or down the first transmission line to be a second level may be on a board of the target system (a user board or a substrate on which a microcomputer is mounted), or located on the side of the debug tool.

According to sixteenth aspect of the invention, in a debug system, the first common control unit in the integrated circuit device includes an enforcing output circuit that outputs a value corresponding to the second level so as to make the first communication line have the second level when the pulling-up or down circuit is in the off state.

For example, if a device is designed so that the run/break-state signal takes L level in the run state and H level in the break state, it may include the enforcing output circuit that outputs a value corresponding to H level so as to make the first communication line have H level when the circuit for pulling-down the first communication line is in the off state.

Further, the present invention can be applied to a structural design where the run/break-state signal is H level when it in the run state, and the run/break-state signal is L level when it in the break state. Further, a pull-up circuit may be applied instead of a pull-down circuit and switching on and off under the run state and/or the break state may be inverted against the above case.

According to seventeenth aspect of the invention, in a debug system, in a debug system including a pin-saving debug tool and a target system, which is an object to be debugged by the debug tool, the target system comprises an integrated circuit device including an internal debugging module for on-chip debugging while communicating with the pin-saving debug tool, and a CPU. The integrated circuit device includes: a second debug terminal coupled to a second communication line; a second main common control unit that controls using the second transmission line for both transmission of a clock signal for synchronization, which is necessary for on-chip debugging with the pin-saving debug tool, and transmission of a run/break state signal, which shows a run state or a break state of the CPU. The debug tool includes a second sub common control unit that controls using the second transmission line for both transmission of a clock signal for synchronization, which is necessary for on-chip debugging with the integrated circuit device, and receipt of a run/break state signal, which shows a run state or a break state of the CPU.

According to eighteenth aspect of the invention, in a debug system, the second common control unit in the integrated circuit includes a circuit that outputs a clock signal for synchronization to the second communication line when the CPU is in the break state, and masks the output of a clock signal for synchronization to the second communication line when the CPU is in the run state. The debug tool includes a unit determining that the CPU in the integrated circuit is in the break state when it receives a clock signal for synchronization from the second communication line, and that the CPU in the integrated circuit is in the run state when it does not receive a clock signal for synchronization.

According to nineteenth aspect of the invention, a microcomputer includes any of the abovementioned integrated circuits.

According to twentieth aspect of the invention, an electronic instrument comprises: the above mentioned microcomputer; a source for inputting data that is an object to be processed by the microcomputer; and a unit that outputs data processed by the microcomputer.

BRIEF DESCRIPTION OF THE DRAWINGS

The invention will be described with reference to the accompanying drawings, wherein like numbers reference like elements.

FIGS. 8A and 8B are timing charts showing an example in which a microcomputer is in the break state.

DESCRIPTION OF EXEMPLENARY EMBODIMENTS

The embodiments of the present invention will now be described with reference to the accompanying drawings.

1. Feature of the Embodiment

When debugging a microcomputer 20 with a debug tool 110 with clock synchronization communication, the following communications are generally needed:

(A) inputting the break signal to the microcomputer 20 from the debug tool 110;

(B) outputting the break/run state to the debug tool from the microcomputer;

(C) transmitting data (such as debugging commands) to the microcomputer 20 from the debug tool 110;

(D) transmitting data to the debug tool 110 from the microcomputer 20;

(E) communicating a synchronization clock signal; and (F) communicating additional information such as break input, trace and the like.

Hence, pins (terminals) for debugging are needed in order to couple these communication lines with the microcomputers. However, numbers of unnecessary terminals, which are used only for debugging, is preferably minimized for an end user. Thus, in the embodiment, the structure, which will be explained hereafter, prevents these unnecessary terminals from increasing.

Figure 1A:
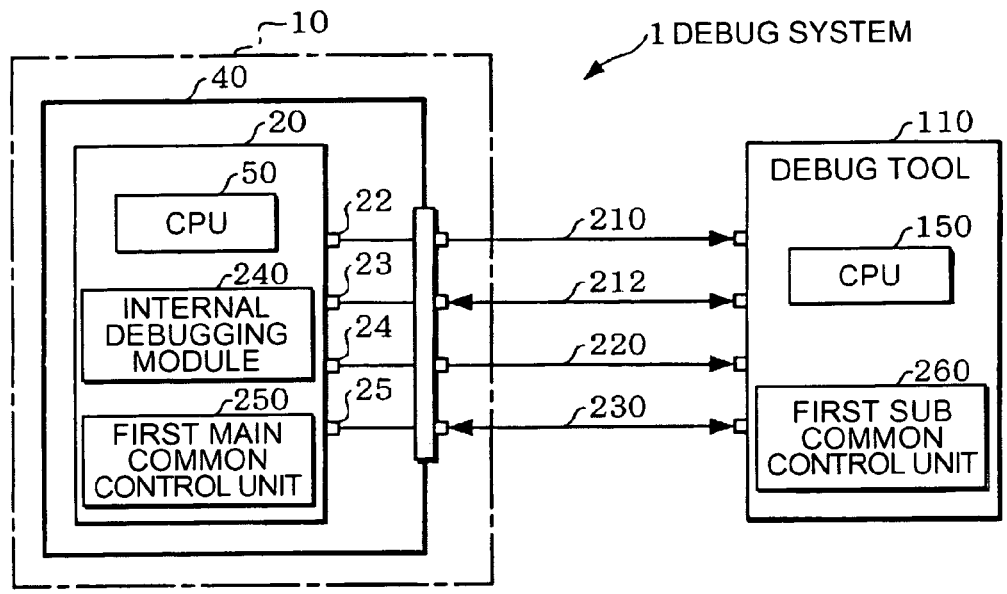
FIGS. 1A to 1C are diagrams showing a microcomputer (an example of a integrated circuit) and a debug system in a first embodiment.
Figure 1B:
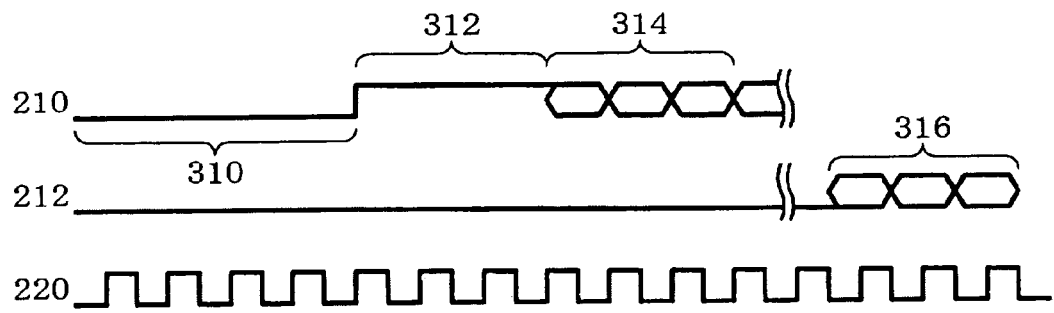
Figure 1C:
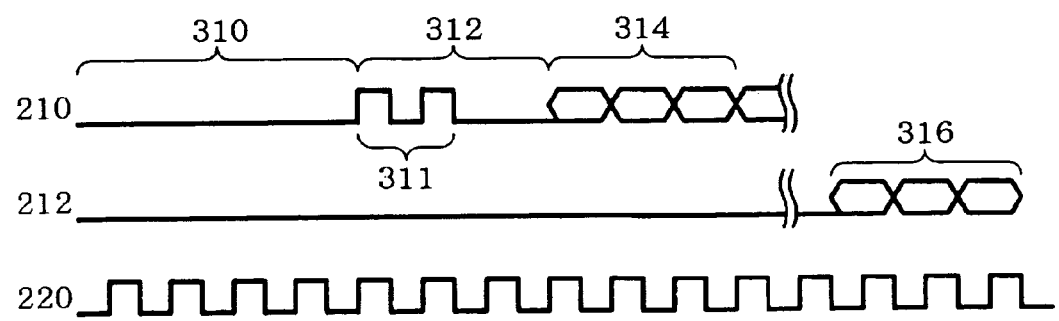

FIGS. 1A to 1C are diagrams showing a microcomputer (an example of a integrated circuit) and a debug system in a first embodiment.

FIG. 1A shows a debug system 1 including a pin-saving debug tool 110 and a target system 10, which is an object to be debugged by the debug tool 110.

The target system 10 comprises an microcomputer (an example of integrated circuit device) 20 including an internal debugging module 240 for on-chip debugging while communicating with the pin-saving debug tool 110, and a CPU 50.

The microcomputer 20 includes a first main debug terminal 22 coupled to a first communication line 210 and a first main common control unit 250 that controls using the first communication line 210 for both transmission of serial data signal corresponding to debug data for transmission, which is sent and/or received to and/or from the pin-saving debug tool during on-chip debugging, and transmission of a run/break state signal, which shows a run state or a break state of the CPU.

The debug tool 110 includes a first sub debug terminal coupled to a first communication line 210 and a first sub common control unit 260 that controls using the first communication line 210 for both transmission of serial data signal corresponding to debug data for transmission, which is sent and/or received to and/or from the integrated circuit device during on-chip debugging, and transmission of a run/break state signal, which shows a run state or a break state of the CPU.

Communication lines 210, 212, 220 and 230 are used by the microcomputer 20 of the target system 10 and the debug tool 110 during debugging in a first embodiment.

The communication line 210 transmits serial data to be debugged from the microcomputer to the debug tool (SOUT; a communication line corresponding to the above D). The communication line 212 transmits serial debug data (including debugging commands) from the debug tool to the microcomputer (SIN; a communication line corresponding to the above C.) These lines are coupled to the microcomputer via terminals 22 and 23 for debugging.

The communication line 220 is a clock line used for synchronous communication (a signal line corresponding to the above E) and coupled to the microcomputer via a terminal 24 for debugging.

The communication line 230 transmits other necessary signals such as break input for debugging (a communication line corresponding to the above A and F) and coupled to the microcomputer via a terminal 25 for debugging.

In the first embodiment, the excusive line for transmitting the run/break state signal (corresponding to the above B) from the microcomputer 20 to the debugging module 110 is not installed. The communication line 210 of SOUT is also used for it instead.

As shown in FIG. 1B, when the CPU 50 of the microcomputer 20 is in the run state (a user mode, for example), the SOUT 210 outputs a first level (such as L level for example) signal and outputs a second level (such as H level for example) signal when the CPU comes to be in the break state thereafter. Then, pulse signals 314 corresponding to communication data are output just after beginning communication. Further, during communication state, a pulse signal 216 is input from the SIN 212.

The data output SOUT to be debugged from the microcomputer is not generated during the run state (a user mode for example.) The debug tool 110 determines that the microcomputer is in the run state when the state of SOUT (210) is the first level (310 for example.) Then, during the run state, when the SOUT 210 is changed to the second level from the first level, the debug tool 110 determines that the microcomputer is changed to be in the debug state. Then, during the break state, it determines that pulse signals (316 for example) are output data to debugged when pulse signals corresponding to communication data are output.

In FIG. 1B, when a single common line is used for both SOUT and the run/break signal, SOUT (210) comes to be the first level (L level for example) if the microcomputer is in the run state and SOUT (210) comes to be the second level (H level for example) if it is in the break state. But it is not limited to the case.

As shown in FIG. 1C, when the CPU 50 of the microcomputer 20 is in the run state (a user mode, for example), SOUT 210 may output a first level (such as L level for example) signal and then output a plurality of predetermined pulses (two or more, for example) when the CPU comes to be in the break state (312) thereafter. Then, pluses signals 314 corresponding to communication data are output just after beginning communication.

Thus, the communication line 210 and the terminal for debugging 22 are used for both the output signal to be debugged (SOUT) and the run/break state signal, reducing the numbers of terminals for debugging.

Figure 2A:
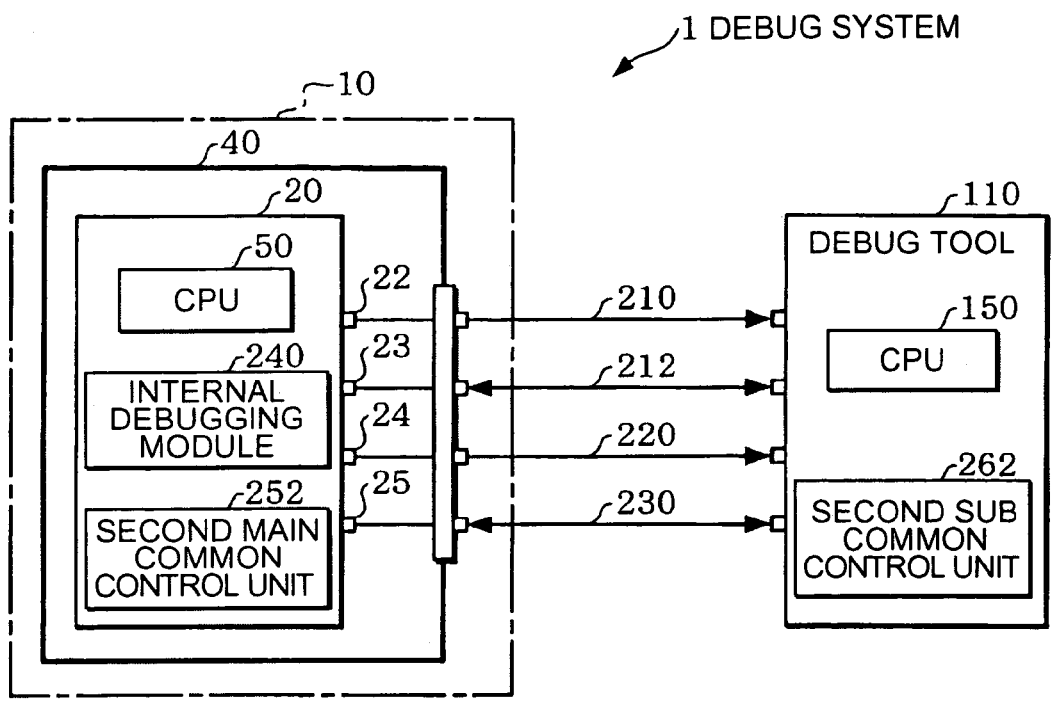
FIGS. 2A and 2B are diagrams showing a microcomputer (an example of a integrated circuit) and a debug system in a second embodiment.
Figure 2B:
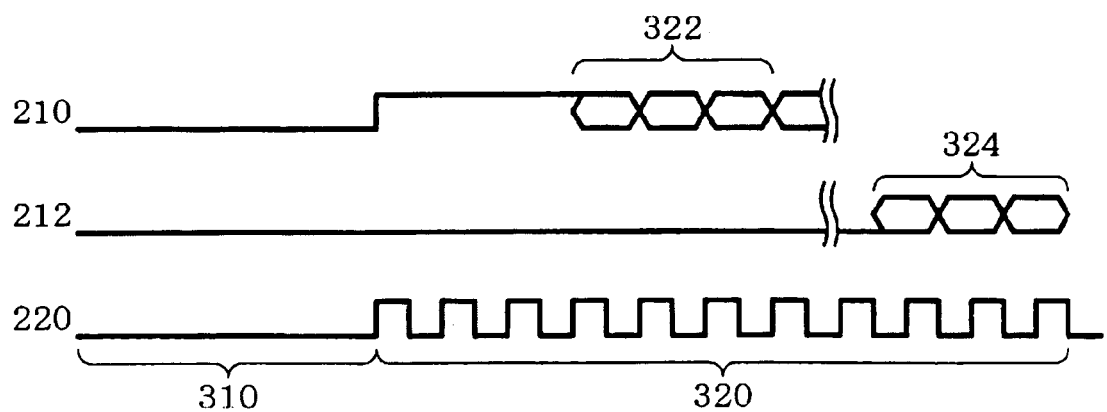

FIGS. 2A and 2B are diagrams showing a microcomputer (an example of an integrated circuit) and a debug system in a second embodiment.

A debug system 1 includes a pin-saving debug tool 110 and a target system 10, which is an object to be debugged by the debug tool 110.

The target system 10 comprises the microcomputer 20 including the internal debugging module 240 for on-chip debugging while communicating with the pin-saving debug tool 110, and the CPU 50.

The microcomputer 20 includes a second debug terminal 24 coupled to the second communication line 220 and a second main common control unit 252 that controls using the second communication line 220 for both transmission of serial data signal corresponding debug data for transmission, which is sent and/or received to and/or from the pin-saving debug tool during on-chip debugging, and transmission of a run/break state signal, which shows a run state or a break state of the CPU.

Further, the debug tool 110 includes a second sub common control unit 262 that controls using the second transmission line 220 for both transmission of a clock signal for synchronization, which is necessary for on-chip debugging with the microcomputer 20, and receipt of a run/break state signal, which shows a run state or a break state of the CPU.

Here, the second main common control unit 252 in the microcomputer 20 may include a clock output control circuit that outputs a clock signal for synchronization to the second communication line 220 when the CPU 50 is in the break state, and masks the output of a clock signal for synchronization to the second communication line 220 when the CPU 50 is in the run state.

Further, the debug tool 110 may include a unit determining that the CPU in the microcomputer 20 is in the break state when it receives a clock signal for synchronization from the second communication line 220, and that the CPU in the microcomputer 20 is in the run state when it does not receive a clock signal for synchronization.

Communication lines 210, 212, 220 and 230 shown in FIG. 2A are used by the microcomputer 20 of the target system 10 and the debugging module 110 during debugging in the second embodiment.

The communication line 210 transmits serial data to be debugged from the microcomputer to the debugging module (SOUT; a communication line corresponding to the above D). The communication line 212 transmits serial debug data (including debugging command) from the debugging module to the microcomputer (SIN; a communication line corresponding to the above C.) These lines are coupled to the microcomputer via terminals 22 and 23 for debugging.

The communication line 220 is a clock line used for synchronous communication (a signal line corresponding to the above E) and coupled to the microcomputer via the terminal 24 for debugging.

The communication line 230 transmits other necessary signals such as break input for debugging (a communication line corresponding to the above A and F) and coupled to the microcomputer via the terminal 25 for debugging.

In the second embodiment, the excusive line for transmitting the run/break state signal (corresponding to the above B) from the microcomputer 20 to the debug tool 110 is not installed. The communication line 220 for a synchronization clock is also used for it instead.

As shown in FIG. 2B, the clock signal 220 for synchronization is not output (under a masked state such as 310 for example) when the CPU 50 of the microcomputer 20 is in the run state (a user mode, for example), but is output (see 320) when the CPU 50 is in the break state. Pulse signals 322 corresponding communication data is output thereafter when the communication begins. Further, during the communication state, the pulse signals 324 corresponding the communication data are input from SIN 212.

The debug tool 110 does not require the synchronization clock for debugging during the run state (a user mode, for example), but requires it during the break state (a debug mode for example.) The debug module 110 determines that the microcomputer is in the run state when the module does not receive the synchronization clock 220 (310 for example.) Then, when it receives the synchronization clock 220, the debug tool 110 determines that the microcomputer is changed to be the debug state. Then, during the break state, it determines that pulse signals (322 for example) are output data for debug when the pulse signals corresponding to communication data are output.

Thus, the communication line 220 and the terminal for debugging 24 are used for both the clock signal for synchronization (SOUT) and the run/break state output signal, reducing the numbers of terminals for debugging.

Figure 3A:
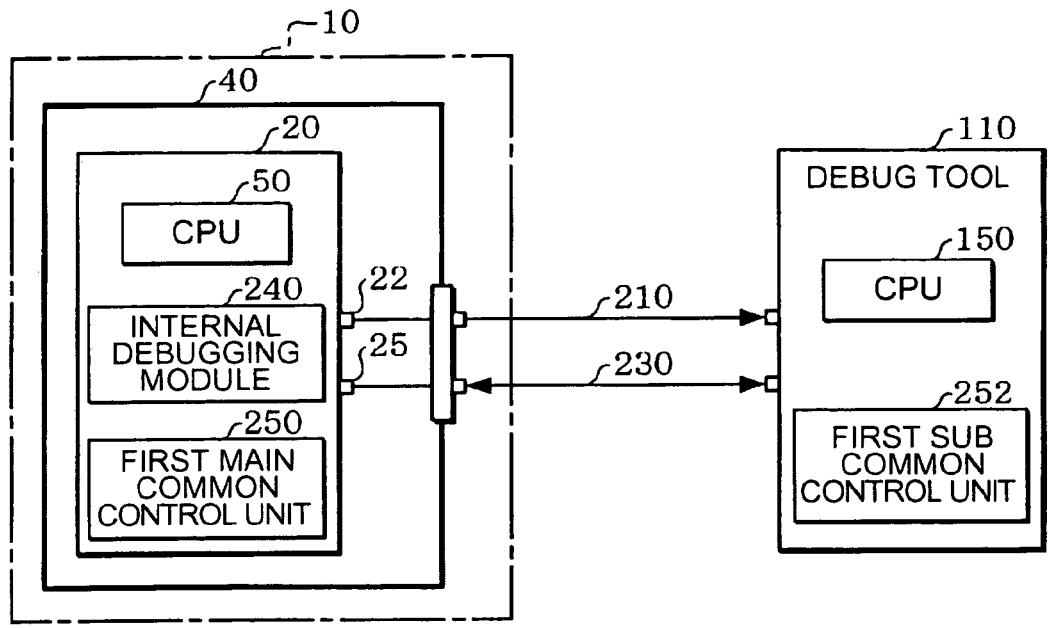
FIGS. 3A and 3B are diagrams showing a microcomputer (an example of a integrated circuit) and a debug system in a third embodiment.
Figure 3B:
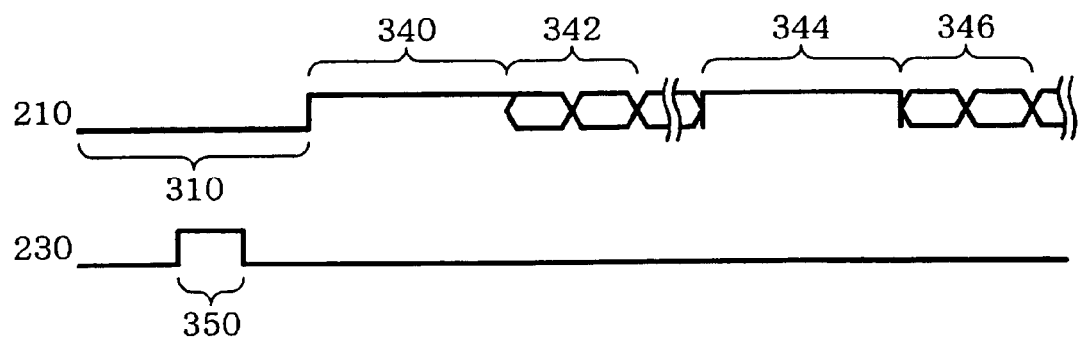

FIGS. 3A and 3B are diagrams showing a microcomputer (an example of an integrated circuit) and a debugging system in a third embodiment.

The third embodiment is a modification of the first embodiment. The first debug terminal 22 is coupled to the communication line 210, which is used for transmission and receipt of data for debug with a half-double bilateral communication and the first common control unit 250 in the microcomputer 20 controls using the first communication line 210 for both transmission of serial data signal corresponding debug data for transmission, which is sent and/or received to and/or from the pin-saving debug tool 110 during on-chip debugging, and transmission of a run/break state signal, which shows a run state or a break state of the CPU 50.

Communication lines 210 and 230 are used by the microcomputer 20 of the target system 10 and the debug tool 110 during debugging in the third embodiment.

The communication line 210 is a communication line for asynchronously transmitting and/or receiving debug data with a half-double bilateral communication between the microcomputer and the debug module (SIO, a signal line corresponding to the above D and C) and coupled to the microcomputer via the terminal 22 for debugging.

The communication line 230 transmits other necessary signals such as break input for debugging (a communication line corresponding to the above A and F) and coupled to the microcomputer via the terminal 25 for debugging.

In the third embodiment, the excusive line for transmitting the run/break state signal (corresponding to the above B) from the microcomputer 20 to the debug tool 110 is not installed. The half-double bilateral communication line 210 is also used for it instead.

As shown in FIG. 3B, when the CPU 50 of the microcomputer 20 is in the run state (a user mode, for example), SIO 210 becomes the first level (L level for example, see 310), and when the CPU 50 becomes the break state, it changes to the second level ((H level for example, see 340.) Then, it changes to the pulse signals 342 corresponding communication data when communication begins and is maintained to be the second level (H level for example, see 344) after completion data. Further, it changes to be the pulse signal 346 corresponding to communication data from the debug module to the microcomputer.

Here, the change from the run mode (a user mode for example) to the break mode (a debug mode for example) may be occurred by the break (such as PC break for example), which is generated within the microcomputer, or by receiving the enforcing break signal 350 shown as 230 from the debug tool.

There is no communication data under the run mode (a user mode for example) in the bilateral communication line SIO between the microcomputer and the debug module. Here, showing as 350, the debug tool 110 determines that the microcomputer is in the run state when the state of SIO (210) is the first level (310 for example.) Then, during the run state, when the SIO 210 is changed to the second level from the first level (310 to 340), the debug tool 110 determines that the microcomputer is changed to be the debug state. Then, during the break state, it determines that pulse signals 342 corresponding to communication data are output data for debug when the pulse signals are output under the debug state.

Thus, the communication line 210 and the terminal for debugging 22 are used for both the bilateral communication for debug data (SIO) and the run/break state signal, reducing the numbers of terminals for debugging.

Figure 4A:
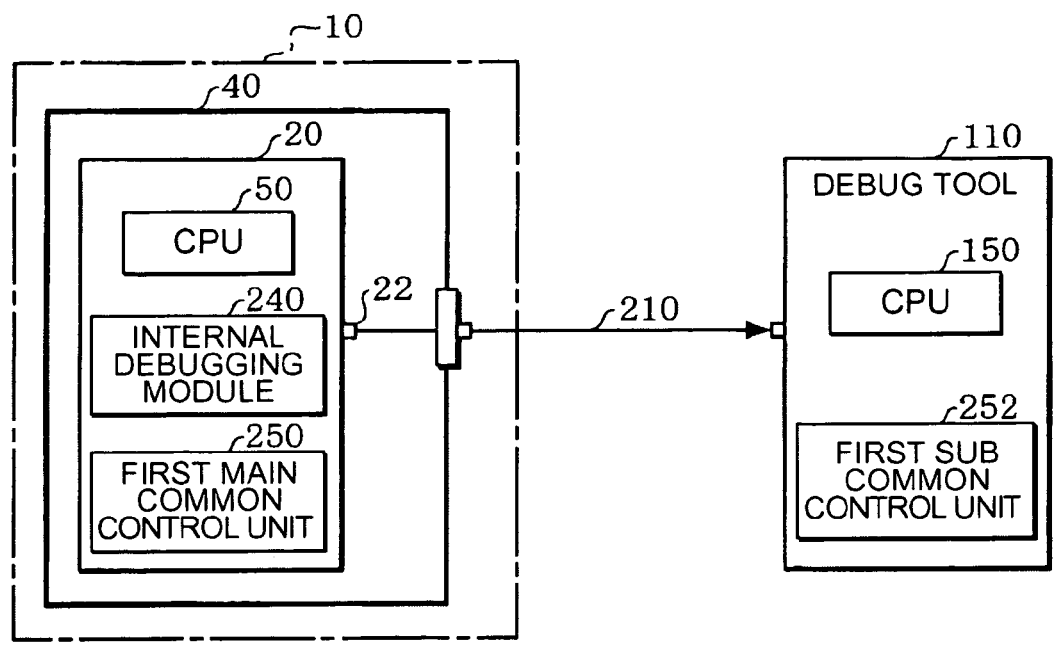
FIGS. 4A and 4B are diagrams showing a microcomputer (an example of a integrated circuit) and a debug system in a fourth embodiment.
Figure 4B:
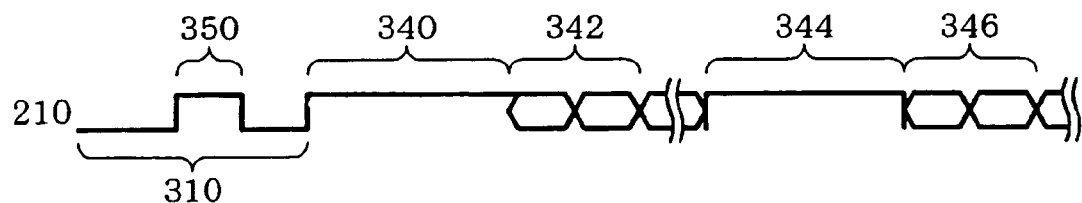

FIGS. 4A and 4B are diagrams showing a microcomputer (an example of an integrated circuit) and a debugging system in a fourth embodiment.

The fourth embodiment is a modification of the third embodiment. The microcomputer 20 is formed so as to receive an enforcing break signal from the debug tool 110 via the first communication line (210 here.) The first main common control unit 250 of the microcomputer 20 includes a circuit that detects the enforcing break signal within received data input via the first communication line 210, and changes the CPU to be in the break state when detecting the enforcing break signal.

The first sub common control unit 252 in the debug tool 110 includes an enforcing-break-output control unit that outputs an enforcing-break-input signal to the first communication line via the first sub debug terminal, wherein the enforcing-break-input signal makes the microcomputer be in the break state.

The communication line 210 is used by the microcomputer 20 of the target system 10 and the debug tool 110 during debugging in the fourth embodiment.

The communication line 210 is a communication line for asynchronously transmitting and/or receiving debug data with a half-double bilateral communication between the microcomputer and the debug tool (SIO, a signal line corresponding to the above D, C and A) and coupled to the microcomputer via a terminal 22 for debugging.

Here, the communication line 210 is shared by the signal SIO for debug data, which is asynchronously transmitted and/or received with a half-double, and the break input (a communication line corresponding to the above A and F.)

In the fourth embodiment, the excusive line for transmitting the run/break state signal (corresponding to the above B) from the microcomputer 20 to the debug tool 110 is not installed. The half-double bilateral communication line 210 (including the break input) is also used for it instead.

As shown in FIG. 4B, when the CPU 50 of the microcomputer 20 is in the run state (a user mode, for example), SIO 210 becomes the first level (L level for example, see 310. Further, when the break input 350 is transmitted to the microcomputer from the debug tool 110 via the SIO 210, the CPU 50 becomes the break state and the SIO 210 changes to the second level ((H level for example, see 340.) Then, it changes to the pulse signals 342 corresponding communication data when communication begins and is maintained to be the second level (H level for example, see 344) after completing data. Further, it changes to be the pulse signals 346 corresponding to communication data from the debug tool to the microcomputer.

Here, the change from the run mode (a user mode for example) to the break mode (a debug mode for example) may be occurred by the break (such as PC break for example), which is generated within the microcomputer, or by receiving the enforcing break signal 350 from the debug tool. In the latter case, the pulse width of the enforcing break signal is preferably more than several clocks comparing to the clock width of the CPU clock.

There is no communication data under the run mode (a user mode for example) in the bilateral communication line SIO between the microcomputer and the debug module. Here, showing as 350, the debug tool 110 determines that the microcomputer is in the run state when the state of SIO (210) is the first level (310 for example.) Then, during the run state, when the SIO 210 is changed to the second level from the first level (310 to 340), the debug tool 110 determines that the microcomputer 20 is changed to be in the debug state. Then, during the break state, it determines that pulse signals 342 corresponding to communication data are output data for debug when the pulse signals are output under the debug state.

Thus, the communication line 210 and the terminal for debugging 22 are used for both the bilateral communication for debug data (SIO) and the run/break state output signal, reducing the numbers of terminals for debugging in the microcomputer.

The concrete example of the fourth embodiment is explained as following.

Figure 5:
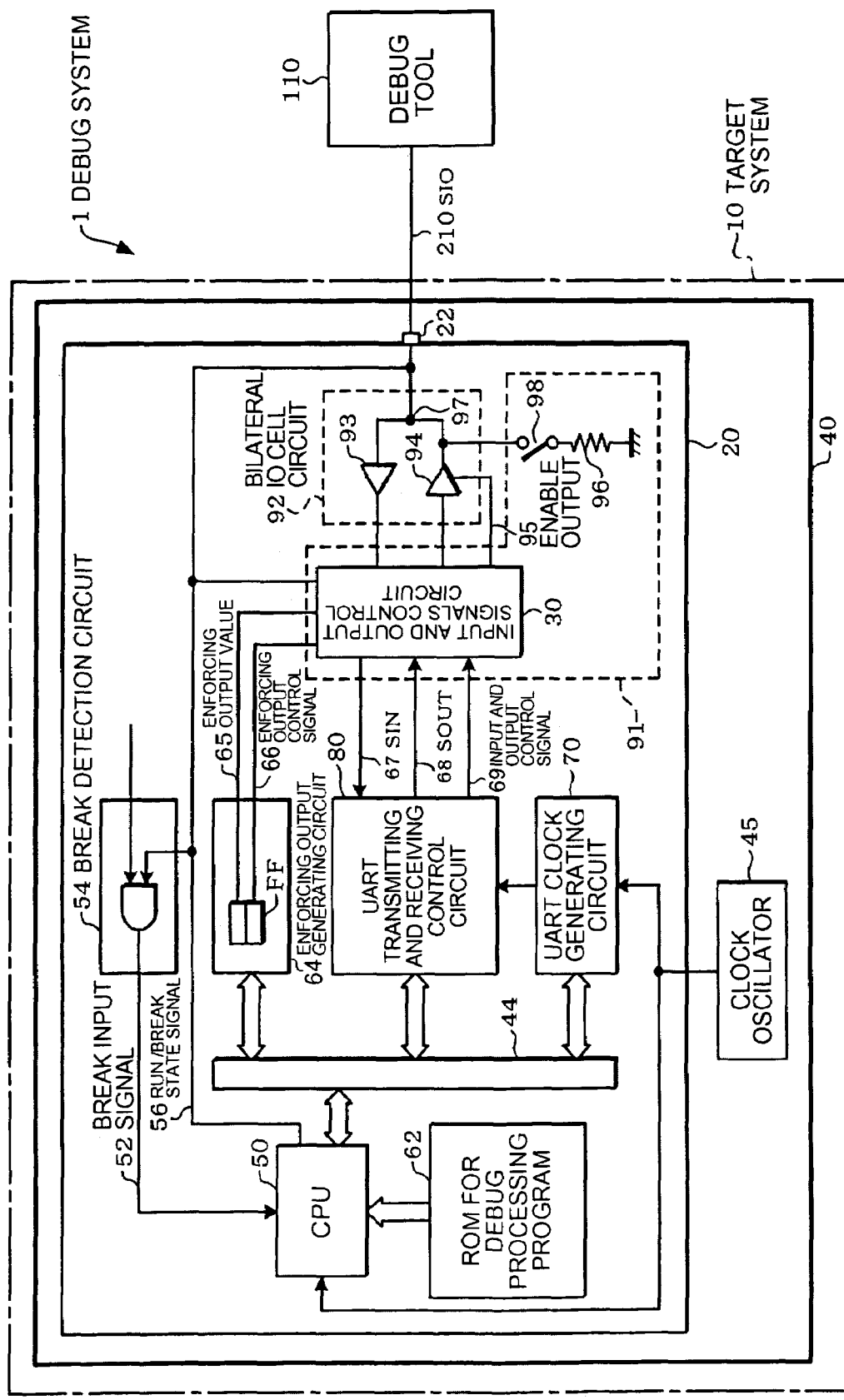
FIG. 5 is a diagram showing a target system, a debug system, and a microcomputer in the fourth embodiment.

FIG. 5 is a diagram showing a target system, a debugging system, and a microcomputer in the fourth embodiment.

The debug system 1 includes the debug tool (ICE and the like) 110 and the target systems 10, which is an object to be debugged by the debug tool 110.

In the target system 10, the microcomputer 20 (an example of a integrated circuit including a CPU) is mounted on substrate (a user board) 40. On the substrate (a user board) 40, integrated circuits such as memory and the like more than the microcomputer 20 and an oscillator such as a quartz oscillator generating and outputting a digital clock (a clock generator) may be mounted.

The microcomputer 20 includes the terminal for debugging 22, which is coupled to a single communication line for transmitting and receiving serial data to be debugged with a half-double bilateral communication.

Further, the microcomputer 20 includes the CPU 50, a UART clock generating circuit 70, a UART transmitting and receiving control circuit 80, a break detection circuit 54, an input and output signals control circuit 30, a bilateral IO cell circuit 92, a ROM for storing debug processing program 62, a bus 44, a pull down control circuit 96 and 98 and others.

The CPU 50, an enforcing output generating circuit 64, the UART clock generating circuit 70, and the UART transmitting and receiving control circuit 80 are coupled to the bus 44.

The ROM for storing a debug processing program 62 is coupled to the CPU 50 and executes a program for debugging, which is read out from the ROM 62.

The connector of the user board is coupled to the debug tool via the SIO communication line 210 while performing a half-double bilateral communication during debugging.

The break detecting circuit 54 detects the break input from the debug tool based on an input and output signal value (an input signal value) and outputs the break input signal 52 (it becomes H level when the break input is generated) to the CPU 50.

Further, the CPU 50 outputs the run/break signal state signal 56 (: 1 under the run state and 0 under the break state.)

An external input or output signal is input to an input buffer 93 of the bilateral IO cell circuit 92. The output buffer 94 of the bilateral IO cell circuit 92 becomes the output state when the output enable 95 is 1, and becomes high impedance and the state where the external input is available when the output enable 95 is 0.

The output data line is coupled to the pull down circuit 96 between the output buffer 94 of the bilateral IO cell circuit 92 and a node 97. An enable switch 98 is turned ON (pull down enable) to make the input and output line be L level. Then, during the break, the enable switch 98 is turned OFF (pull down disable) to make the input and output line be H level.

The UART clock generating circuit 70 generates a clock signal, which is supplied to the UART transmitting and receiving control circuit 80 based on a standard clock received from the clock oscillator.

The UART transmitting and receiving control circuit 80 controls communication for asynchronously and serially transmitting and receiving debug data with a pin-saving debug tool, by using a clock signal generated from the UART clock generating circuit 70 as an operating clock signal. It, further, changes bite data from a parallel bus within the microcomputer to a serial bit stream. Further, it also changes a bit stream input to the serial port via an IO cable to parallel bite data, which can be processed by the microcomputer.

The enforcing output generating circuit 64 is a circuit that controls outputting the enforcing output value 65 as an output signal. For example, it outputs the first value (an enforcing output value 1 bit) and the second value (an enforcing output control signal 1 bit) stored in the 2 bite flip-flop FF.

The input and output signal control circuit 30 is coupled to the UART transmitting and receiving control circuit 80 and transmits and receives data of the UART transmitting and receiving control circuit 80. Further, the input and output signal control circuit 30 controls transmitting and receiving data of the SIO control unit 92, and generates transmission data (processing merging data for debug and the run/break state signal.)

Figure 6:
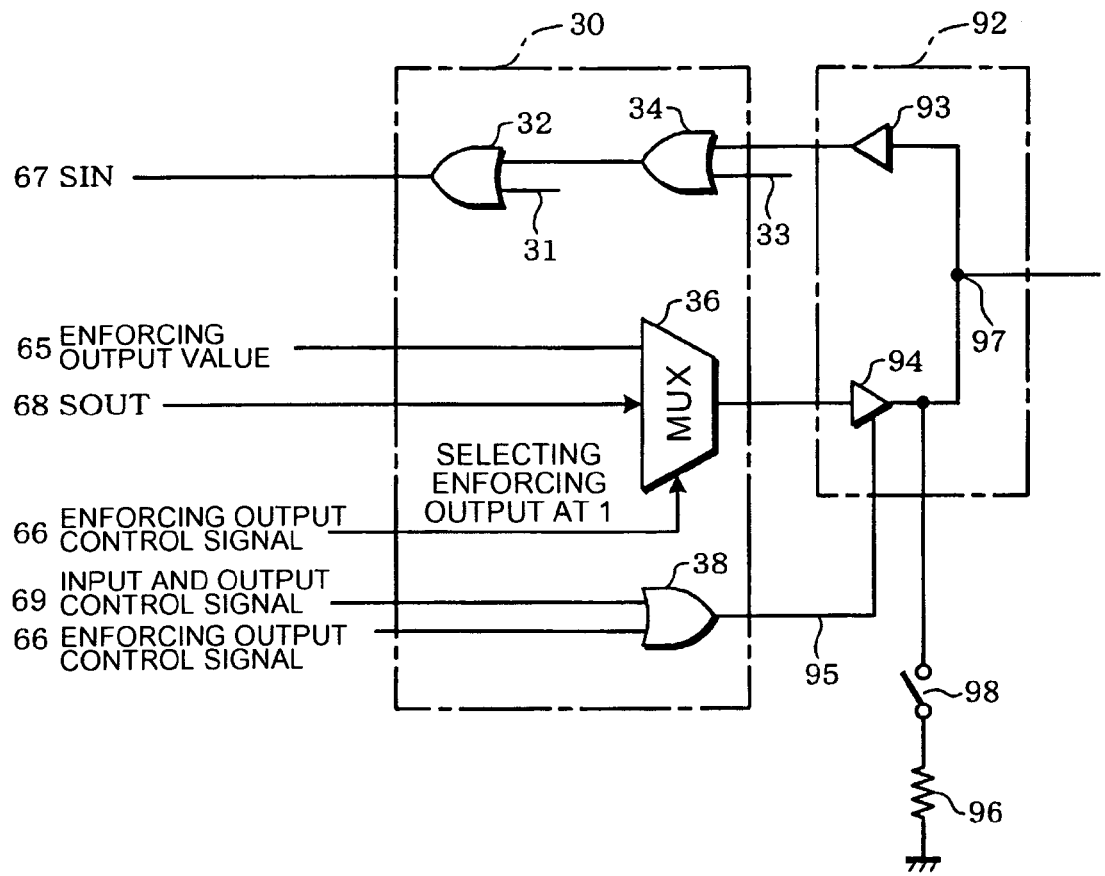
FIG. 6 is a diagram showing an example of an input and/or output signal control circuit 30.

FIG. 6 is a diagram showing an example of the input and output signal control circuit 30.

The input and output signal control circuit 30 includes a first OR circuit 32, a second OR circuit 34, a selection circuit 36 and a third OR circuit 38.

One of inputs of the second OR circuit 34 is coupled to an output of the buffer 93 of the bilateral IO cell circuit. Another of inputs is coupled to a mask control signal 33 so as to mask SIN to be H level at the time of outputting UART.

One of inputs of the first OR circuit 32 is coupled to an output of the second OR circuit 34. Another of inputs is coupled to a mask control signal 31 so as to mask SIN to be H level during run time.

A first input, a second input and a switching input of the selection circuit 36 are coupled to the enforcing output value 65, SOUT 68 and the enforcing output control signal 66. The output of the selection circuit 36 is coupled to the input of the buffer 94 of the bilateral IO cell circuit to control outputting the enforcing output value 65 or SOUT 68 by switching them based on the enforcing output control signal 66.

One of inputs of the third OR circuit 38 is coupled to the input and output control signal 69 and another of them is couple to the enforcing output control signal 66. The output of the third OR circuit 38 is coupled to the enable input of the buffer 94 of the bilateral IO cell circuit.

The enforcing output control signal 66 becomes 1(H) at outputting, and 0(L) at inputting. Therefore, the output buffer 94 becomes enabled and data is output to the bilateral communication line when SOUT is output (when the input and output signal control signal is 1(H)) or when the enforcing output control signal is 1(H.)

The output data line is coupled to the pull down circuits 96 and 98 between the output buffer 94 of the bilateral IO cell circuit 92 and the node 97. An enable switch 98 is turned ON (pull down enable) during the run to make the input and output line be L level. Then, during the break, the enable switch 98 is turned OFF (pull down disable) to make the input and output line be H level. Then, during the break, the enforcing value (H) is output to make the input and output data line be H level.

Accordingly, as shown in FIG. 4B, the above circuit shows that SIO 210 becomes L level (see 310) when the CPU 50 of the microcomputer 20 is in the run state (a user mode, for example), and it changes to H level (see 340) when the CPU 50 becomes the break state. Then, when the communication begins, it changes to the signals 342 corresponding to the communication data and held to be H level again after data completion (see 344.)

Figure 7:
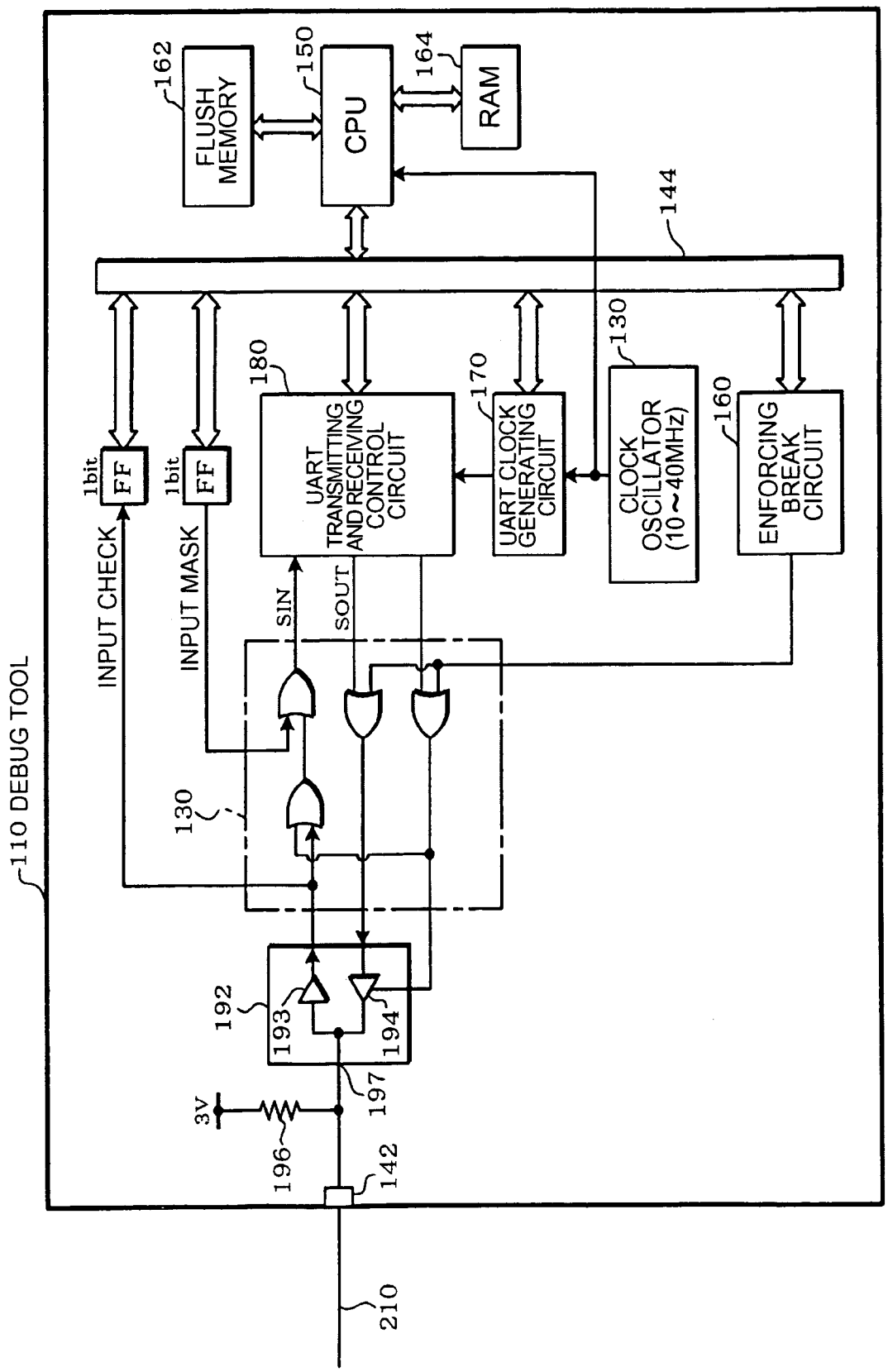
FIG. 7 is a diagram showing an example of the debug tool of the embodiment.

FIG. 7 is a diagram showing an example of the debug tool of the embodiment.

Further, the debug tool 110 includes a CPU 150, a UART clock generating circuit 170, a UART transmitting and receiving control circuit 180, an input and output signals control circuit 130, an enforcing break circuit 160, a bilateral IO cell circuit 192, RAM (RAN for work) 164, a flush memory (for storing a ICE control program) 162, an variable oscillator 130, a pull up circuit 196, a bus 144 and others.

The CPU 150, the UART clock generating circuit 170, the UART transmitting and receiving control circuit 180 and the enforcing break circuit 160, are coupled to the bus 144.

The flush memory (for storing a ICE control program) 162 is coupled to the CPU 150 and executes a program for controlling the debug tool, which is read out from the flush memory 162.

The external terminal 142 of the debug tool 110 is coupled to the target system via the communication line 210 while performing a half-double bilateral communication during debugging.

An external input or output signal is input to the input buffer 193 of the bilateral IO cell circuit 192. The output buffer 194 of the high impedance and the state where the external input is available when the output-enable 95 is 0.

Further, the input and output data line is coupled to the pull-up circuit 196 between the external terminal 142 and the node 197 so as to be H level when there is no input and output (no input and output during the break.)

The UART clock generating circuit 170 generates a clock signal supplied to the UART transmitting and receiving control circuit 180 based on a standard clock received from the clock oscillator.

The UART transmitting and receiving control circuit 180 controls communication for asynchronously and serially transmitting and receiving debug data to and from the microcomputer, by using a clock signal generated from the UART clock generating circuit 170 as an operating clock signal. It also changes bite data from a parallel bus within the debug tool to a serial bit stream. Further, it also changes a bit stream input to the serial port via an SIO cable to parallel bite data, which can be processed by the microcomputer.

The enforcing break circuit 160 generates and outputs the enforcing break signal (a pulse having a predetermined width) for generating enforcing break in the microcomputer. The enforcing break circuit 160 is a circuit that controls outputting the enforcing output value 65 as an output signal based on the instruction to the input and output signal control circuit 130. For example, it outputs the first value (an enforcing output value 1 bit) and the second value (an enforcing output control signal 1 bit) stored in the 2 bite flip-flop FF.

The input and output signal control circuit 130 is coupled to the UART transmitting and receiving control unit 180 and the enforcing break generation circuit 160. It transmits and receives transmitting and receiving data from or to the UART transmitting and receiving control unit 180. Further, it merges transmitting debug data, which is output from the UART transmitting and receiving control unit 180, with the enforcing break signal generated by the enforcing break generation circuit and outputs them as output data to the bilateral communication line.

The input and output line is coupled to the pull-up circuit 198 (coupled to a 3V power source via a resister 100 k Ω) so as to be H level when there is no communication.

FIG. 8A shows an example of timing chart when the microcomputer automatically becomes the break state and FIG. 8B shows an example of timing chart when the microcomputer becomes the break state by receiving enforcing break from the debug tool.

In FIG. 8A, 400 of the bilateral communication line SIO is L level during the break state of the microcomputer. Then, when the run order is sent to the microcomputer from the debug tool for example (see 402), the microcomputer becomes the pull down enable state and the bilateral communication line SIO gradually becomes L level (see 412.) Further, when the break is generated within the microcomputer (414) afterward, the microcomputer becomes the break state and the enforcing output instruction signal in the enforcing out put unit becomes 1. Then, it rapidly becomes H level by forcibly outputting H level from the microcomputer (see 422.) Then, during the break, 420 is held to be H level afterward by the pull-up circuit (see 196 in FIG. 7), which is installed in the debug tool.

As shown in FIG. 8B, the enforcing break input 414' of 400 is transmitted to the microcomputer from the debug tool during the run. Further, when the enforcing break input is received, the microcomputer becomes the break state and the enforcing output instruction signal in the enforcing out put unit becomes 1. Then, it rapidly becomes H level by forcibly outputting H level from the microcomputer (see 422.) Then, during the break, 420 it is held to be H level afterward by the pull-up circuit (see 196 in FIG. 7), which is installed in the debug tool.

Figure 9:
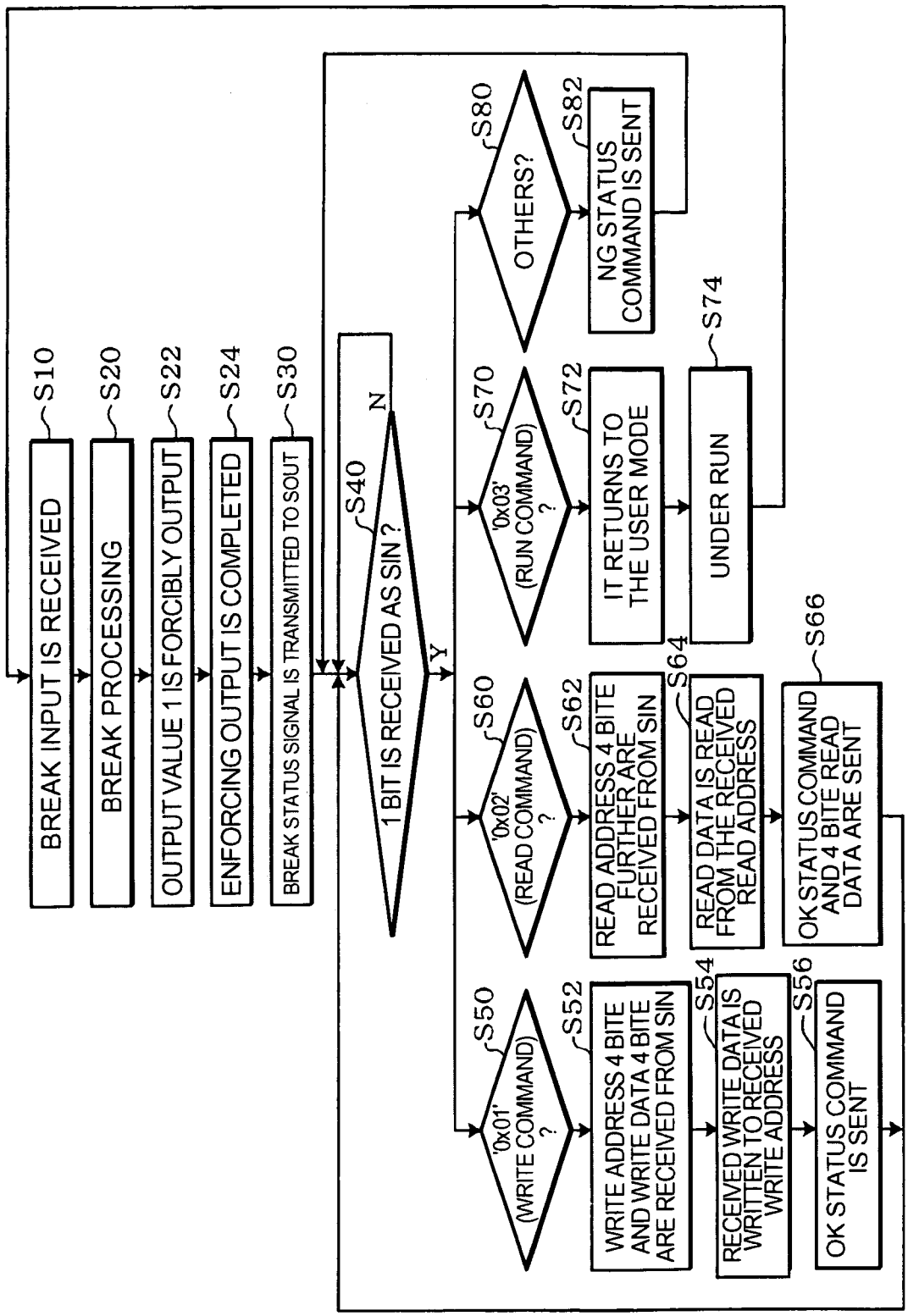
FIG. 9 is a flow chart of the operation of a microcomputer in a target system at the time of debugging process.

FIG. 9 is a flow chart of the operation of a microcomputer in a target system at the time of debugging process.

First, when the break input is received (a step S10), the break processing (transferring from a user mode to a debug mode in the CPU) is performed (a step S20.) The break input may be received as an interrupt signal of the CPU.

Next, it forcibly outputs the output value 1 (a step S22) and completes enforcing output after a predetermined period (a step S24.)

When, it is transferred to the debug mode, it transmits the break status signal to SOUT (a step S30.) The break status signal at SOUT is sent to the debug tool via the SIO communication line.

Next, when 1 bit (a debug command) is received as SIN from the debug tool, the following processes are preformed (a step S40.)

If the debug command is a write command, write address 4 bite and write data 4 bite are received from SIN (steps S50 and S52.) Then, after receiving, received write data is written to the received write address (a step S54) and OK status command is sent (a step S56.)

If the debug command is a read command, read address 4 bite further are received from SIN (steps S60 and S62.) Then, after receiving, read data is read from the received read address (a step S64) and a status command and 4 bite read data are sent (a step S66.)

If the debug command is a run command, it returns to the user mode (steps S70 and S72) and becomes the state for receiving the break input.

If the debug command is more than the above, NG status command is sent (steps S80 and S82.)

Figure 10:
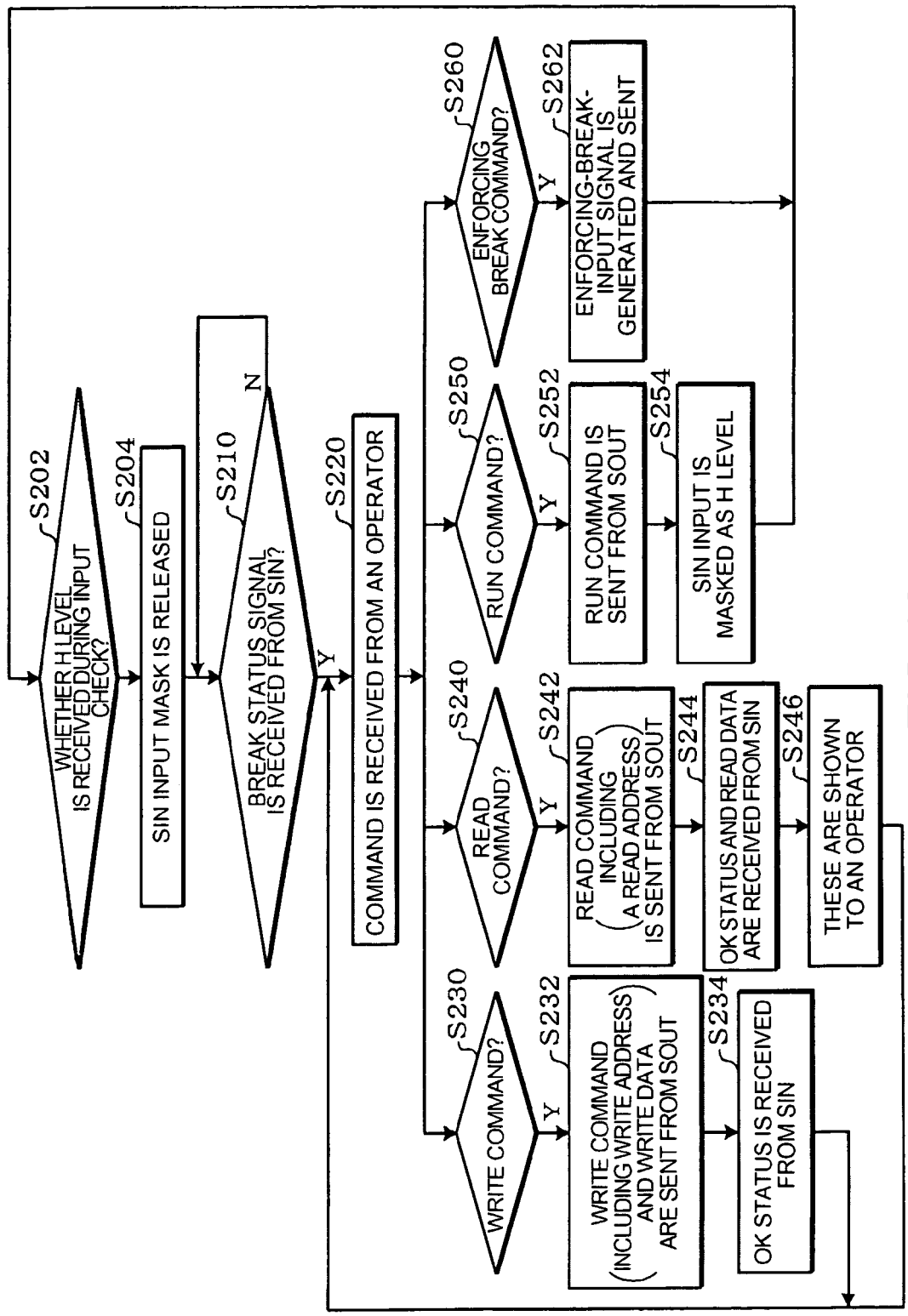
FIG. 10 is a flow chart of the operation of a debug tool at the time of debugging process.

FIG. 10 is a flow chart of the operation of a debug tool at the time of debugging process.

The microcomputer checks the input of SIN during the run as the user mode, when H level is received, SIN input mask is released (steps S202 and S204.)

Then, when the break status signal is received from SIN, the following processes are performed (step S210.)

First, a command for debugging, which is applied to the debug tool, is received from an operator (step S220.)

If the debug command is a write command, a write command (including write address 4 bite and write data 4 bite) are sent from SOUT (steps S230 and S232.)

Then, OK status is received from the SIN (a step S234.)

If the received command is a read command, the read command (including a read address 4 bite) is sent from SOUT (steps S240 and S242.)

Then, OK status and read data 4 bite are received from SIN (a step S244), these are shown to a operator (a step S246.)

If the received command is a RUN command, the RUN command is sent from SOUT and SIN input is masked as H level (steps S250, S252 and S254) and it returned to the step S202.

If the received command is an enforcing break command, an enforcing-break-input signal is generated and sent (steps S260 ands 262.)

In the above embodiment, the structure for detecting the run/break status of the microcomputer was explained based on the level (H level or L level) of data signal (the half-double bilateral communication line SIO, here.) But, the structure is not limited to this. For example, predetermined pulses (corresponding to the break status) may be output by the microcomputer at the break, and the debug tool may detect this output so as to determine that the microcomputer is in the break state.

Figure 11:
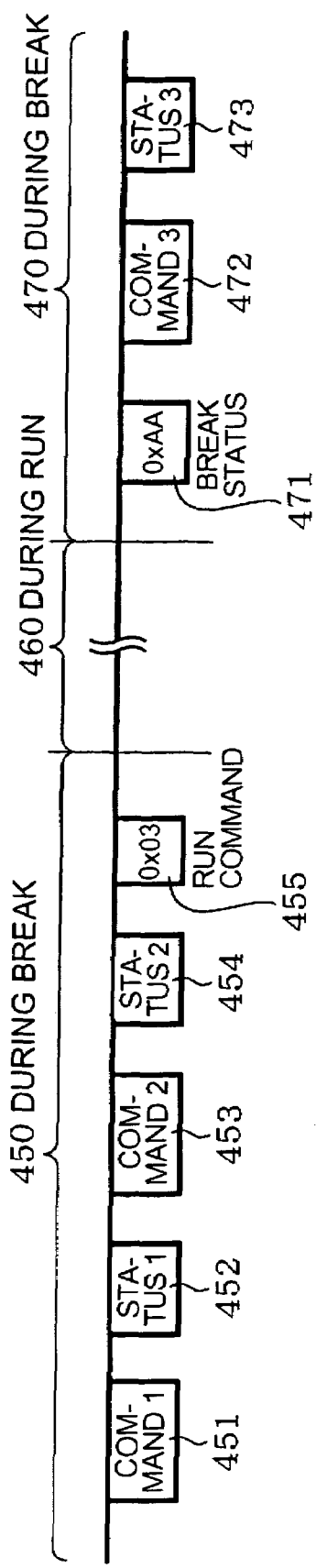
FIG. 11 is a diagram showing a half-double bilateral communication in which data are sent and/or received.

FIG. 11 is a diagram showing an example of sending and receiving data with the communication line when the microcomputer and the debug tool perform the half-double bilateral communication via a single communication line.

451 is a debug command 1, which is sent to the microcomputer from the debug tool under the break state 450, and 452 is a status 1 corresponding to the debug command 1, which is sent to the debug tool from the microcomputer. 453 is a debug command 2, which is sent to the microcomputer from the debug tool, and 454 is a status 2 corresponding to the debug command 2, which is sent to the debug tool from the microcomputer. Thus, if the microcomputer is under the break state 450, a command and a status corresponding to the command are sent and received between the microcomputer and the debug tool based on a predetermined rule (a hand shake, for example.)

Here, if the debug tool sends the run command to the microcomputer, the microcomputer becomes the run state 460. Then, when the break is generated in the microcomputer, it sends the break status (a pulse corresponding to 'xAA') to the debug tool, for example.

The debug tool detects a pulse corresponding to the break status in 471, and determines that the microcomputer is in the break state. Here, determination of the break state including detection of a pulse may be completed with software or hardware such as an exclusive circuit.

Further, after sending the run command 455, the debug tool may determine with software that the microcomputer is in the run state.

Otherwise, after inputting an enforcing break to the microcomputer, the debug tool may determine with software that the microcomputer is in the break state.

Figure 12:
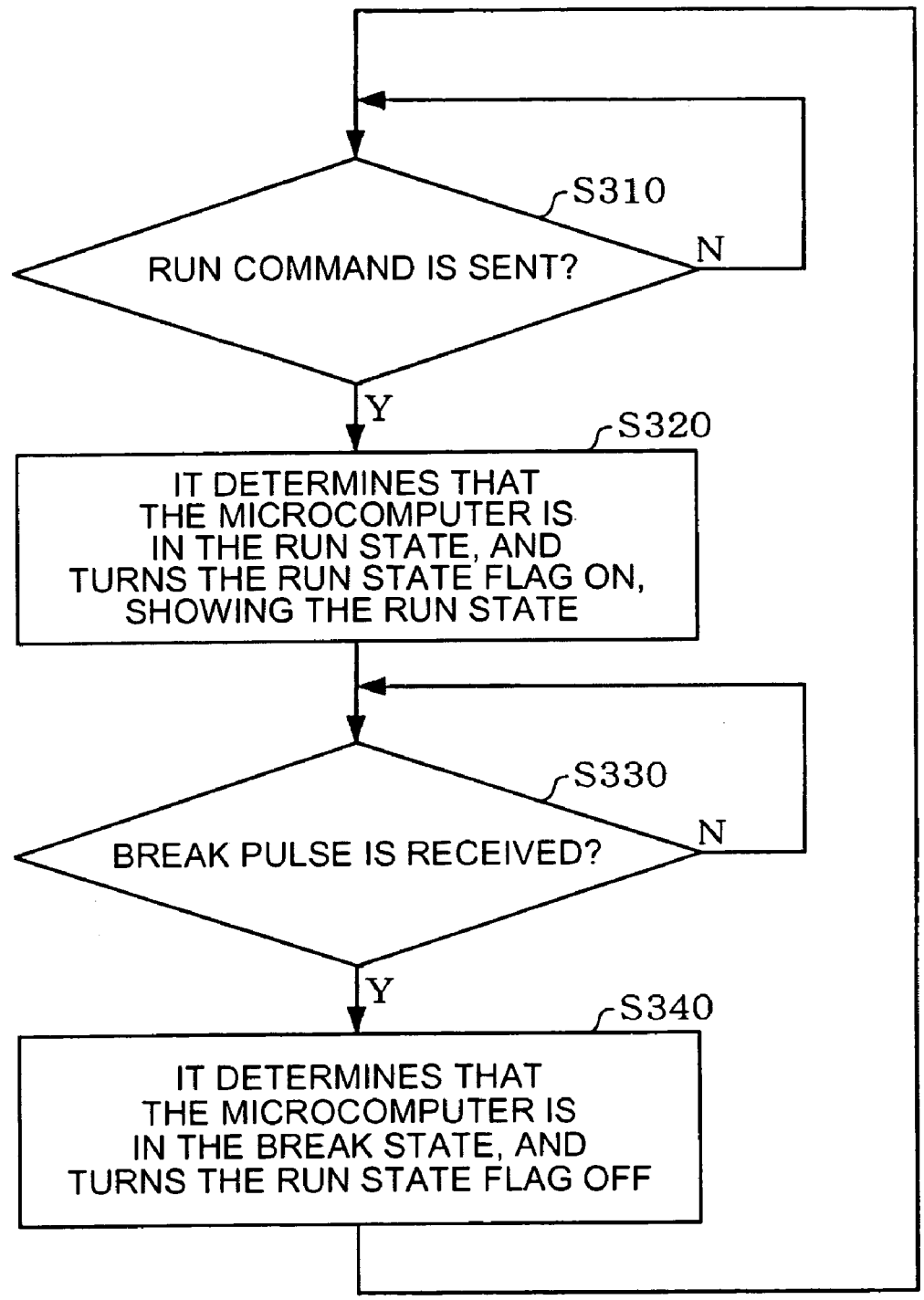
FIG. 12 is a flow chart of an example showing the judgment of the run/break state by the debug tool.

FIG. 12 is a flow chart of an example showing the judgment of the run/break state by the debug tool.

If the run command is sent, it determines that the microcomputer is in the run state, and turns the run state flag on, showing the run state (steps S310 and S320.)

Next, when the debug tool detects whether it receives a break pulse from the microcomputer (a pulse signal corresponding to the break status), and turns the run state flag off when it receives the pulse (steps S330 and S340.)

2. Microcomputer

Figure 13:
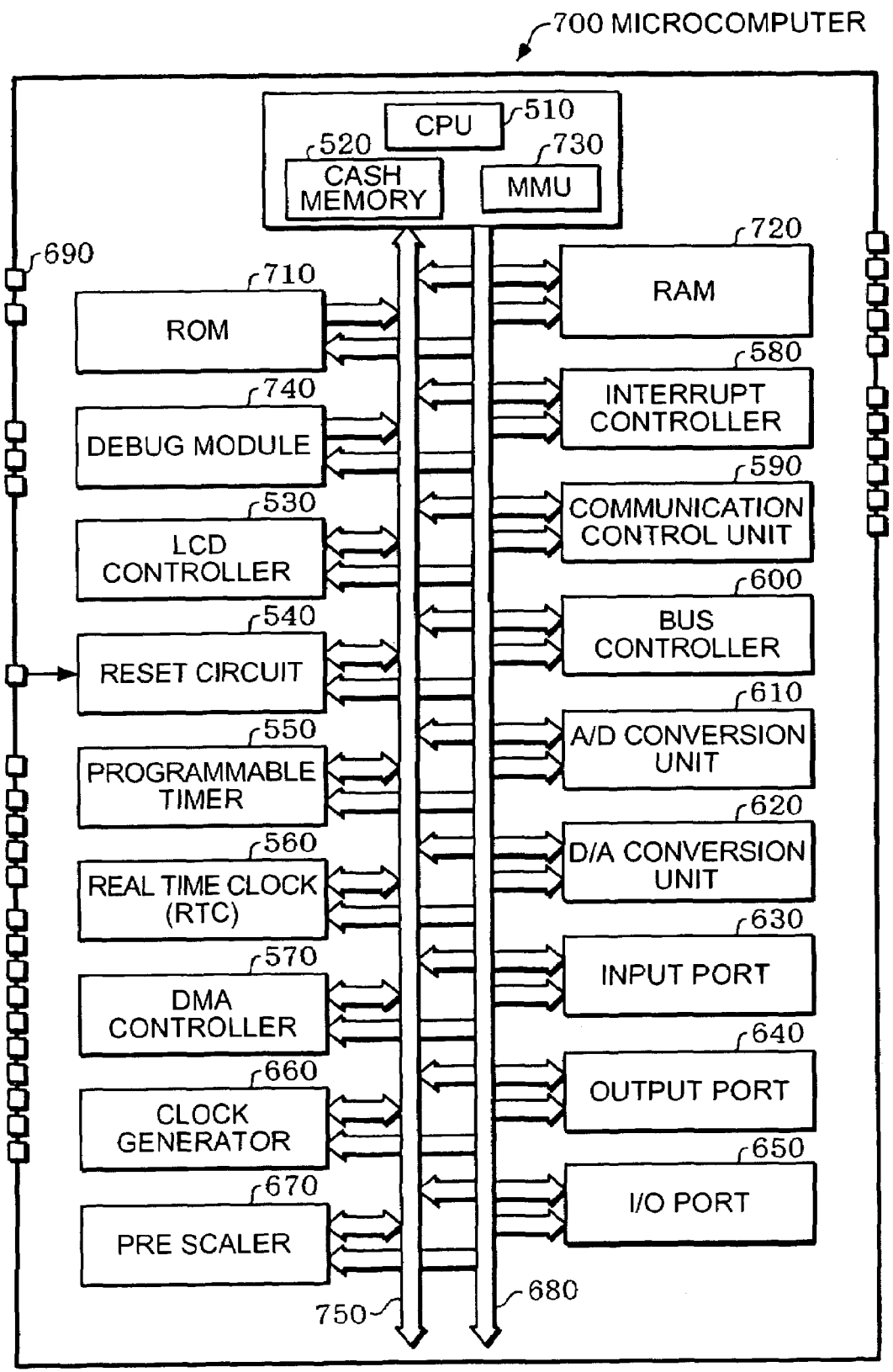
FIG. 13 is a block diagram showing an example of hardware of the microcomputer in the embodiment.

FIG. 13 is a block diagram showing an example of hardware of the microcomputer in the embodiment.

A microcomputer 700 comprises a CPU 510, a cash memory 520, a RAM 710, a ROM 720, a MMU 730 LCD controller 530, a reset circuit 540, a programmable timer 550, a real time clock (RTC) 560, a DMA controller 570, an interrupt controller 580, a communication control unit (a serial interface) 590, a bus controller 600, a A/D conversion unit 610, a D/A conversion unit 620, an input port 630, an output port 640, an I/O port 650, a clock generator 660, a pre scaler 670, a universal bus connecting them 680, a debug module 740 and an excusive bus 750 and various pins 690 and the like.

3. Electronic Apparatus

Figure 14:
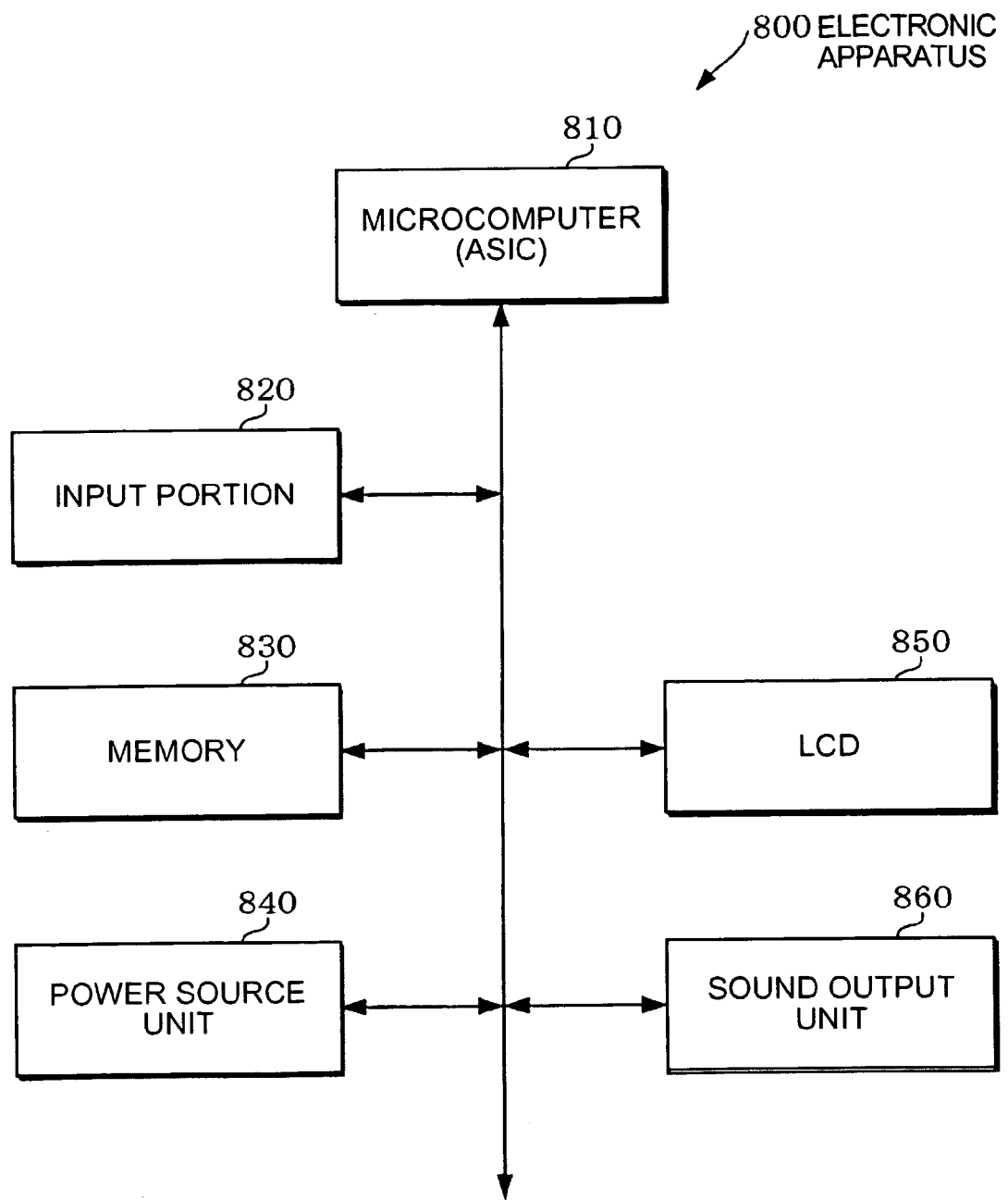
FIG. 14 is a block diagram showing an example of an electronic instrument including the microcomputer.

FIG. 14 is a block diagram of an electronic apparatus of the present embodiment. An electronic apparatus 800 comprises a microcomputer (or ASIC) 810, an input portion 820, a memory 830, an power source unit 840, a LCD 850 and a sound output unit 860.

Here, the input portion 820 inputs various data. The microcomputer 810 performs various processes based on data input by the input portion 820. The memory 830 becomes a working region for the microcomputer 810. The power source unit 840 generates various power sources, which are used for the electronic apparatus 800. The LCD 850 outputs various images (characters, icons and graphics) displayed by the electronic apparatus. The sound output unit 860 outputs various sounds (voices and game sounds), which are output by the electronic apparatus 800 and it's function can be realized by hardware such as a speaker.

Figure 15A:
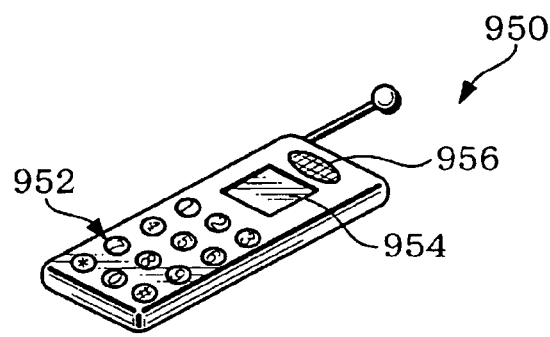
FIGS. 15A, 15B and 15C are schematic views showing examples of various electronic instruments.

FIG. 15A is a schematic view of a mobile phone 950 as one of electronic apparatus. The mobile phone 950 comprises a dial button 952 as inputting function, a LCD 954 displaying phone numbers, names and icons and a speaker 956, which outputs sounds as a sound output unit.

Figure 15B:
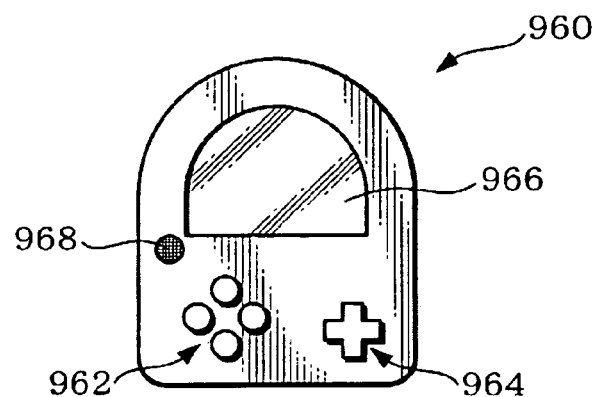

FIG. 15B is a schematic view of a mobile game device 960 as one of electronic apparatus. The mobile game device 960 comprises an operation button functioning as an input unit 962, a cross key 964, a LCD 966 displaying a game image and a speaker 968, which outputs game sounds as a sound output unit.

Figure 15C:
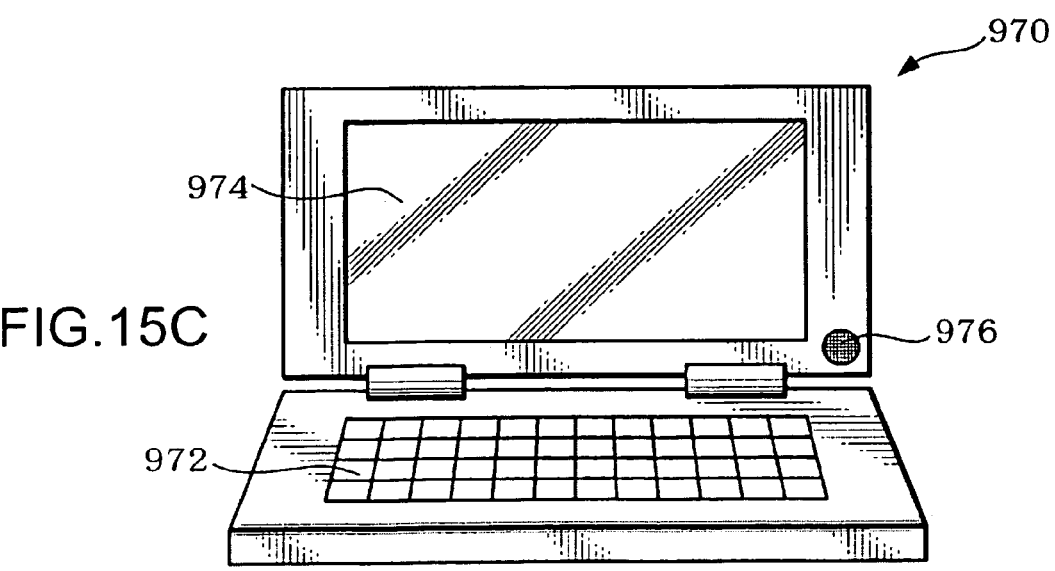
Figure 16:
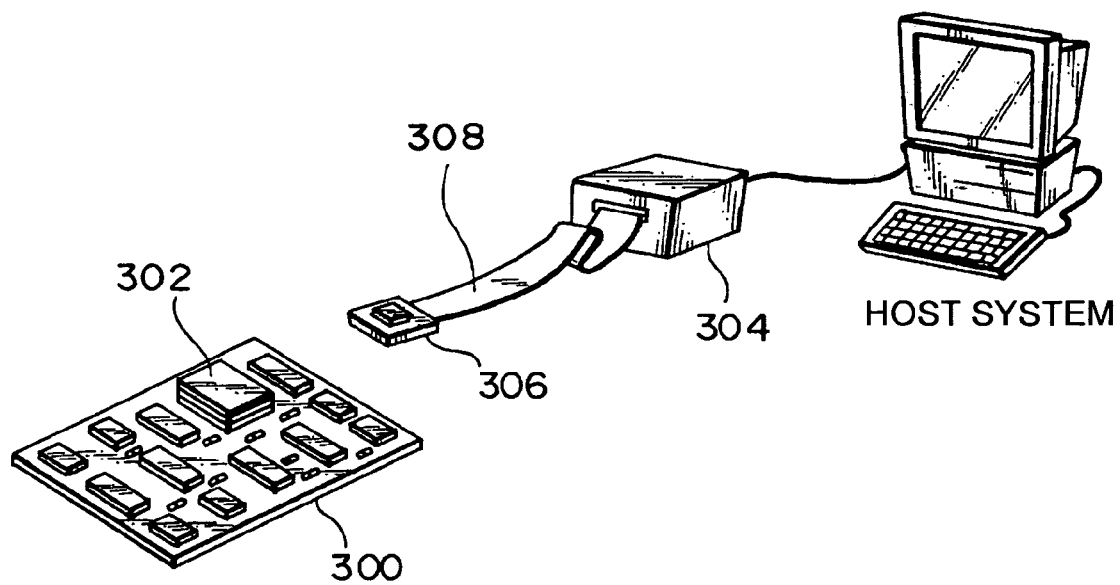
FIG. 16 shows an example of ICE called as conventional CPU replacement.

FIG. 15C is a schematic view of a personal computer 970 as one of electronic apparatus. The personal computer 970 comprises an key board functioning as an input unit 972, a LCD 974 displaying characters, numbers and graphics and a sound output unit 976.

The microcomputer of the embodiments of the invention is incorporated into electronic apparatuses shown in FIGS. 15A to 15C, providing electronic apparatus, which shows high performance with high processing speed and low cost.

Here, as electronic apparatuses using the embodiments of the invention, more than shown in FIGS. 14A to 15C, a mobile personal digital assistance, a pager, a electronic calculator, a device with touch panel, a projector, a word processor, a viewfinder type or direct monitor type video tape recorder, a LCD used for automobile navigation are considered.

It should be noted that the invention is not limited to the above-mentioned embodiments, and can be modified within the scope of the invention.

What is claimed is:

1. An integrated circuit device including an internal debug module for on-chip debugging while communicating with a pin-saving debug tool and a CPU, the integrated circuit device comprising:
   a debug terminal coupled to a communication line;
   a common control unit that controls using the communication line for both transmission of a serial data signal corresponding to debug data that is sent and/or received to and/or from the pin-saving debug tool during on-chip debugging and transmission of a run/break state signal, that shows a run state or a break state of the CPU, from the CPU to the pin-saving debug tool;
   the pin-saving debug tool determining whether the CPU is in the run state or the break state based on the run/break state signal received from the CPU over the communication line.

2. The integrated circuit device according to the claim 1, the debug terminal being coupled to a single communication line as the communication line, the single communication line transmitting and receiving debug data with a half-double bilateral communication, and the common control unit controlling the communication line for both transmission and receipt of the serial data signal corresponding to bilateral debug data for transmitting and receiving, which is sent and/or received to and/or from the pin-saving debug tool during on-chip debugging and transmission of the run/break state signal, which shows the run state or the break state of the CPU.

3. The integrated circuit device according to the claim 1, with an enforced break signal being received from the debug tool via the communication line and the common control unit including a circuit that detects the enforcing break signal within received data input via the communication line, and makes the CPU change to be in the break state when the enforcing break signal is detected.

4. The integrated circuit device according to the claim 1, the common control unit including a circuit that controls the communication line to maintain a first level when the CPU is in the run state, and a second level when the CPU is in the break state, the common control unit controlling the communication line to transmit a pulse corresponding to serial data to be debugged when transmitting serial data to be debugged.

5. The integrated circuit device according to the claim 1, the common control unit including a portion that controls the communication line to transmit a predetermined break pulse when the CPU is changed to be in the break state.

6. The integrated circuit device according to the claim 1, the common control unit including a circuit that pulls-up or down the communication line to be a first level and a circuit that generates an enable signal for switching the pulling-up or down circuit on and/or off in response to the run state or the break state of the CPU.

7. The integrated circuit device according to the claim 6, the common control unit including an enforcing output circuit that outputs a value corresponding to a second level so as to make the communication line have the second level when the pulling-up or down circuit is in the off state.

8. An integrated circuit device including an internal debug module for on-chip debugging while synchronously communicating with a pin-saving debug tool and a CPU, the integrated circuit device comprising;
   a debug terminal coupled to a communication line;
   a common control unit that controls using the transmission line for both transmission of a clock signal for synchronization, necessary for on-chip debugging with the pin-saving debug tool, and transmission of a run/break state signal, that shows a run state or a break state of the CPU, from the CPU to the pin-saving debug tool;
   the pin-saving debug tool determining whether the CPU is in the run state or the break state based on the run/break state signal received from the CPU over the communication line.

9. The integrated circuit device according to the claim 8, the common control unit including a circuit that outputs a clock signal for synchronization to the communication line when the CPU is in the break state, and masks the output of a clock signal for synchronization to the communication line when the CPU is in the run state.

10. A debug system comprising a pin-saving debug tool and a target system, which is an object to be debugged by the debug tool, the target system having an integrated circuit device with an internal debugging module for on-chip debugging while communicating with the pin-saving debug tool, and a CPU,
   the integrated circuit device having:
      a main debug terminal coupled to a communication line;
      a main common control unit that controls using the communication line for both transmission of a serial data signal corresponding to debug data for transmission, that is sent and/or received to and/or from the pin-saving debug tool during on-chip debugging, and transmission of a run/break state signal, that shows a run state or a break state of the CPU, from the CPU to the debug tool;

and the debug tool having:

a sub debug terminal coupled to the communication line; and a sub common control unit that controls using the communication line for both transmission of the serial data signal corresponding to debug data for transmission, that is sent and/or received to and/or from the integrated circuit during on-chip debugging, and receipt of the run/break state signal, that shows the run state or the break state of the CPU, the debug tool determining whether the CPU is in the run state or the break state based on the run/break state signal received from the CPU over the communication line.

11. The debug system according to the claim 10, the main debug terminal being coupled to a single communication line as the communication line, the single communication line transmitting and receiving data for debug with a half-double bilateral communication, the main common control unit in the integrated circuit controlling use of the first communication line for both transmission and receipt of the serial data signal corresponding the debug data for transmitting and receiving, that is sent and/or received to and/or from the pin-saving debug tool during on-chip debugging and transmission of the run/break state signal, that shows the run state or the a break state of the CPU, the sub common control unit in the debug tool controlling use of the communication line for both transmission and receipt of the serial data signal corresponding to the debug data for bilaterally transmitting and receiving, that is sent and/or received to and/or from the integrated circuit device when on-chip debugging the integrated circuit device and transmission of the run/break state signal, that shows the run state or the break state of the CPU.

12. The debug system according to the claim 11, the integrated circuit being formed so as to receive an enforcing break signal from the debug tool via the communication line, the main common control unit including a circuit that detects the enforcing break signal within received data input via the communication line, and that changes the CPU to be in the break state when detecting the enforcing break signal, the sub common control unit in the debug tool including an enforcing-break-output control unit that outputs the enforcing-break-input signal to the communication line via the sub debug terminal, and the enforcing-break-input signal making the integrated circuit device be in the break state.

13. The debug system according to the claim 10, the main common control unit in the integrated circuit device including a circuit that controls the communication line to maintain a first level when the CPU is in the run state and a second level when the CPU is in the break state, and that controls the communication line to transmit a pulse corresponding to serial data to be debugged at the time of transmitting serial data to be debugged, the debug tool determining that the CPU in the integrated circuit is in the run state when the communication line is held to be at the first level, and that the CPU is in the break state when the communication line is held to be at the second level and, the debug tool determining that a pulse is serial data to be debugged when the debug tool receives pulses from the communication line.

14. The debug system according to the claim 10, the main common control unit in the integrated circuit including a portion that controls the communication line to transmit a predetermined break pulse when the CPU is changed to be in the break state, the debug tool including a unit for detecting the predetermined break pulse within the received signals in the first communication line and a unit for judging that the integrated circuit is changed to be in the break state when detecting the predetermined break pulse.

15. The debug system according to the claim 10, the main common control unit in the integrated circuit including a circuit that pulls-up or down the communication line to be at a first level, and a circuit that generates an enable signal for switching the pulling-up or down circuit on and/or off in response to the run state or the break state of the CPU, a board of the debug tool or the target system including a circuit that that pulls-up or down the communication line to be at a second level.

16. The debug system according to the claim 15, the main common control unit in the integrated circuit device including an enforcing output circuit that outputs a value corresponding the second level so as to make the communication line have the second level when the pulling-up or down circuit is in the off state.

17. A debug system comprising a pin-saving debug tool and a target system, that is an object to be debugged by the debug tool, the target system comprising an integrated circuit device including an internal debugging module for on-chip debugging while communicating with the pin-saving debug tool, and a CPU, the integrated circuit device having:

a debug terminal coupled to a communication line;

a main common control unit that controls using the communication line for both transmission of a clock signal for synchronization, that is necessary for on-chip debugging with the pin-saving debug tool, and transmission of a run/break state signal, that shows a run state or a break state of the CPU from the CPU to the debug tool, the debug tool including a sub common control unit that controls using the communication line for both transmission of the clock signal for synchronization, that is necessary for on-chip debugging with the pin-saving debug tool, and receipt of the run/break state signal, that shows the run state or the break state of the CPU, the debug tool determining whether the CPU is in the run state or the break state based on the run/break state signal received from the CPU over the communication line.

18. The debug system according to the claim 17, the main common control unit in the integrated circuit including a circuit that outputs the clock signal for synchronization to the communication line when the CPU is in the break state, and masks the output of the clock signal for synchronization to the communication line when the CPU is in the run state, the debug tool including a unit determining that the CPU in the integrated circuit is in the break state when the unit receives the clock signal for synchronization from the communication line, and that the CPU in the integrated circuit is in the run state when the unit does not receive the clock signal for synchronization.

19. A microcomputer comprising the integrated circuit according to the claim 1.

20. An electronic instrument comprising:

the microcomputer according to the claim 19;

a source for inputting data that is an object to be processed by the microcomputer; and an output unit that outputs data processed by the microcomputer.

* * * * *